(12) United States Patent
Abumiya et al.

(10) Patent No.: US 8,110,162 B2
(45) Date of Patent: Feb. 7, 2012

US008110162B2

(54) METHOD OF PROCESSING COPPER ARSENIC COMPOUND

(75) Inventors: Mitsuo Abumiya, Tokyo (JP); Yusuke Sato, Akita (JP); Hironobu Mikami, Akita (JP); Masami Oouchi, Tokyo (JP); Tetsuo Fujita, Tokyo (JP); Masayoshi Matsumoto, Tokyo (JP)

(73) Assignee: Dowa Metals & Mining Co., Ltd., Tokyo (JP)

( * ) Notice: Subject to any disclaimer, the term of this patent is extended or adjusted under 35 U.S.C. 154(b) by 0 days.

(21) Appl. No.: 12/452,509

(22) PCT Filed: Jul. 11, 2008

(86) PCT No.: PCT/JP2008/062610
§ 371 (c)(1),
(2), (4) Date: Mar. 18, 2010

(87) PCT Pub. No.: WO2009/011316
PCT Pub. Date: Jan. 22, 2009

(65) Prior Publication Data
US 2010/0175509 A1 Jul. 15, 2010

(30) Foreign Application Priority Data

Jul. 13, 2007 (JP) .................................. 2007-185052
Mar. 10, 2008 (JP) .................................. 2008-059366

(51) Int. Cl.
*C01G 28/00* (2006.01)
(52) U.S. Cl. ....................................... 423/87; 423/594.1
(58) Field of Classification Search .................... 423/87, 423/594.1
See application file for complete search history.

(56) References Cited

U.S. PATENT DOCUMENTS

| 4,244,927 | A | 1/1981 | Reynolds et al. |
| 4,572,822 | A | 2/1986 | Abe et al. |
| 5,126,116 | A | 6/1992 | Krause et al. |
| 5,135,223 | A | 8/1992 | You |
| 5,449,503 | A | 9/1995 | Redmon et al. |
| 2003/0192404 | A1* | 10/2003 | Jones .............................. 75/744 |

FOREIGN PATENT DOCUMENTS

| JP | A-58-24378 | 2/1983 |
| JP | A-58-141346 | 8/1983 |
| JP | B2-61-24329 | 6/1986 |
| JP | A-62-182232 | 8/1987 |
| JP | A-4-238816 | 8/1992 |
| JP | A-6-25763 | 2/1994 |
| JP | A-9-110428 | 4/1997 |
| JP | A-9-241776 | 9/1997 |
| JP | A-9-315819 | 12/1997 |
| JP | A-11-47764 | 2/1999 |
| JP | A-2000-219920 | 8/2000 |
| JP | A-2003-137552 | 5/2003 |
| JP | A-2004-307965 | 11/2004 |
| JP | A-2005-161123 | 6/2005 |
| JP | A-2006-116468 | 5/2006 |
| JP | A-2006-198448 | 8/2006 |
| JP | A-2006-328498 | 12/2006 |

OTHER PUBLICATIONS

Nishimura et al., "On the solubility products of Ferric, Calcium and Magnesium Arsenates," *Bulletin of the Research Institute of Mineral Dressing and Metallurgy*, Jun. 1978, pp. 19-26, vol. 34, No. 1, Tohoku University, Sendai, Japan (w/abstract).
Krause et al., "Solubilities and stabilities of Ferric Arsenate compounds," *Hydrometallurgy*, 1989, pp. 311-337, vol. 22 Elsevier Science Publishers B.V., Amsterdam.
Filippou et al., "Arsenic immobilization by controlled Scorodite precipitation," *JOM*, Dec. 1997, pp. 52-55.
International Search Report issued in International Application No. PCT/JP2008/062610 on Oct. 14, 2008.
International Search Report issued in International Application No. PCT/JP2008/062611 on Oct. 14, 2008 (With Translation).
International Search Report issued in International Application No. PCT/JP2008/062615 on Aug. 19, 2008 (With Translation).
International Search Report issued in International Search Report PCT/JP2008/062619 on Aug. 19, 2008 (With Translation).
International Search Report issued in International Application No. PCT/JP2008/062617 on Oct. 21, 2008 (With Translation).
Written Opinion of the International Searching Authority issued in International Application No. PCT/JP2008/062610 on Feb. 9, 2010.
Written Opinion of the International Searching Authority issued in International Application No. PCT/JP2008/062611 on Feb. 9, 2010.
Written Opinion of the International Searching Authority issued in International Application No. PCT/JP2008/062615 on Feb. 9, 2010.
Written Opinion of the International Searching Authority issued in International Application No. PCT/JP2008/062617 on Feb. 24, 2010.
Written Opinion of the International Searching Authority issued in International Application No. PCT/JP2008/062619 on Feb. 9, 2010.
U.S. Appl. No. 12/452,534, filed Mar. 24, 2010 in the name of Mitsuo Abumiya et al.
U.S. Appl. No. 12/452,593, filed Jan. 11, 2010 in the name of Mitsuo Abumiya et al.
U.S. Appl. No. 12/452,586, filed Mar. 29, 2010 in the name of Mitsuo Abumiya et al.

(Continued)

*Primary Examiner* — Steven Bos
(74) *Attorney, Agent, or Firm* — Oliff & Berridge, PLC

(57) ABSTRACT

Provided is a method of easily producing scorodite which is stable and has excellent filtering properties with excellent reproducibility and without using complex operations, when processing arsenic that is included in non-ferrous smelting intermediates, and particularly when processing copper arsenic compounds in the form of an intermetallic compound. Scorodite is produced by a leaching step of leaching arsenic from a non-ferrous melting intermediate containing a copper arsenic compound in the form of an intermetallic compound in the presence of a sulfidizing agent and an oxidizing agent, a solution adjusting step of oxidizing trivalent arsenic to pentavalent arsenic by adding the oxidizing agent to the leaching solution, and a crystallizing step of converting the arsenic in the adjusted solution to scorodite crystals.

9 Claims, 5 Drawing Sheets

OTHER PUBLICATIONS

U.S. Appl. No. 12/452,686, filed Apr. 15, 2010 in the name of Mitsuo Abumiya.

Weert et al., "Aqueous Processing of Arsenic Trioxide to Crystalline Scorodite," *JOM*, Jun. 1994, pp. 36-38, vol. 46, No. 6. Published by Springer New York LLC, USA.

Droppert et al., "Ambient Pressure Production of Crystalline Scorodite From Arsenic-Rich Metallurgical Effluent Solutions," *EPD Congress*, Feb. 4, 1996, pp. 227-239, published by The Minerals, Metals &Materials Society, Warrendale, Pa, USA.

Extended European Search Report issued in European Application No. 08791096.4 on Jul. 22, 2010.

Extended European Search Report issued in European Application No. 08791100.4 on Aug. 27, 2010.

Extended European Search Report issued in European Application No. 08791098.0 on Jul. 27, 2010.

Extended European Search Report issued in European Application No. 08791092.3 on Jun. 28, 2010.

Supplementary European Search Report issued in Application No. 08 79 1091; Dated Oct. 12, 2010.

Mar. 7, 2011 Office Action issued in U.S. Appl. No. 12/452,534.

May 26, 2011 Office Action issued in U.S. Appl. No. 12/452,586.

May 31, 2011 Office Action issued in U.S. Appl. No. 12/452,593.

May 31, 2011 Office Action issued in U.S. Appl. No. 12/452,686.

Sep. 9, 2011 Notice of Allowance issued in U.S. Appl. No. 12/452,534.

Sep. 20, 2011 Notice of Allowance issued in U.S. Appl. No. 12/452,593.

Sep. 21, 2011 Notice of Allowance issued in U.S. Appl. No. 12/452,686.

Sep. 19, 2011 Office Action issued in U.S. Appl. No. 12/452,586.

\* cited by examiner

METHOD OF PROCESSING COPPER ARSENIC COMPOUND

TECHNICAL FIELD

The present invention relates to an arsenic processing method of extracting arsenic from copper arsenic compounds which are included in smelting intermediates that contain arsenic, and converting the arsenic to scorodite crystals, being a stable arsenic compound.

BACKGROUND ART

The following documents concerning the stability of compounds which contain arsenic are available. Patent document 1 presents a method of producing scorodite from arsenic contained in smelting smoke and ash.

Patent document 2 presents a method of leaching arsenic sulfide where air is blown into a slurry containing arsenic sulfide while adding an alkali, in order to lead to arsenic while maintaining the pH between 5 and 8.

Non-patent document 1 reports on the solubility product of iron arsenate, calcium arsenate, and magnesium arsenate. According to this document, calcium arsenate and magnesium arsenate are stable only in the alkali region, but iron arsenate is stable from the neutral to acidic region, and the minimal solubility at a pH of 3.2 was reported to be 20 mg/L.

Non-patent document 2 discloses the solubility of iron arsenate and scorodite. This document shows that the solubility of arsenic from scorodite in the weakly acidic region is two orders of magnitude smaller than that of noncrystalline iron arsenate, and discloses that scorodite is a stable arsenic compound.

Non-patent document 3 presents a method of producing scorodite from arsenic contained in sulfuric acid plant waste water and smelter waste water.

Patent document 1: Japanese Patent Application Laid-open No. 2005-161123

Patent document 2: Japanese Patent Publication No. S61-24329

Non-patent document 1: Tadahisa Nishimura and Kazumitsu Tozawa, Res. Inst. of Mineral Dressing and Metallurgy, Tohoku University, No. 764, Vol. 34, Edition 1, Reprint June 1978.

Non-patent document 2: E. Krause and V. A. Ettel, "Solubilities and Stabilities of Ferric Arsenate Compounds"Hydrometallurgy, 22, 311-337, (1989)

Non-patent document 3: Dimitrios Filippou and George P. Demopoulos, "Arsenic Immobilization by Controlled Scorodite Precipitation" JOM December, 52-55, (1997)

DISCLOSURE OF THE INVENTION

Problems that the Invention is to Solve

In recent years, the global environment for securing raw material ore for use in non-ferrous smelting has become extremely difficult. In the field of copper smelting in particular, the supply is extremely tight because oligopolization by the major non-ferrous manufacturers is progressing, and new major consuming countries such as developing country are appearing. Under these conditions, environmental regulations with regards to pollution are becoming stricter and more obligatory in all countries. The present inventors believe that mines and smelters that can coexist with the environment will lead this industry in the future.

Herein, the pollution that is a concern for non-ferrous smelting includes air pollution due to $SO_2$ gas, as well as soil and waste water pollution by arsenic. With regards to arsenic in particular, the amount of arsenic included in copper ore will increase in the future, so an infallible countermeasure is necessary.

Conventionally, coastal non-ferrous smelters in Japan have been operating without problem by using clean concentrate ore as a processing raw material. However, the amount of arsenic in copper ore is expected to increase in the future. Therefore, extracting arsenic from the system as smelting intermediates and stabilizing and storing arsenic in some form will be necessary.

Overseas, there are many smelters which store arsenic as calcium arsenate, diarsenic trioxide, or arsenic sulfide compounds. However, based on observations by the present inventors, these arsenic compounds are not perfectly stable in a natural environment.

Therefore, the present inventors researched the aforementioned documents. However, all of these methods have various problems with regards to productivity, and the stability of the scorodite that is produced, and the like.

In light of the foregoing, an object of the present invention is to resolve these problems, and provide a method for processing arsenic that is included in copper arsenic compounds, comprising: extracting arsenic from non-ferrous smelting intermediates containing arsenic, and especially from copper arsenic compounds where copper and arsenic exist in the form of an intermetallic compound; and forming scorodite which is an arsenic compound that is more stable than arsenic compounds of the aforementioned conventional technologies.

Means to Solve the Problems

The present inventors have conducted diligent research in order to resolve the aforementioned problems. As a result, it was conceived that arsenic can be recovered as scorodite crystals from non-ferrous smelting intermediates containing copper arsenic compounds which are arsenic compounds in the form of an intermetallic compound, by a first step (leaching step) of extracting arsenic by leaching from non-ferrous smelting intermediates to obtain a leaching solution; a second step (solution adjusting step) of oxidizing the trivalent arsenic in the leaching solution to a pentavalent form using an oxidizing agent such as hydrogen peroxide, and then removing the residual hydrogen peroxide to obtain an adjusted solution; and a final step (crystallizing step) of adding and dissolving ferrous ($Fe^{2+}$) salt in the adjusted solution in order to perform oxidation in an acidic state and thus convert the arsenic to scorodite.

At this point, the present inventors discovered that in the leaching step, the copper and arsenic oxidation dissolution reactions and the copper sulfidation reaction can be made to proceed simultaneously, by treating the copper arsenic compound with an oxidizing agent in the presence of monatomic sulfur, and applying a redox potential of 250 mV (Ag/AgCl reference electrode) or higher. Furthermore, the present inventors discovered that as a result of the oxidation dissolution reaction and the sulfidation reaction proceeding simultaneously, the arsenic can be made to leach (dissolve) into the water, while the copper will form a sulfide, and will not be leached into the water. In addition, the present inventors discovered that an oxidation reaction of oxidizing trivalent arsenic to pentavalent arsenic in a short period of time can be performed by blowing an oxidized gas into an aqueous solution containing the trivalent arsenic while heating the aqueous solution containing the trivalent arsenic in the presence of the three types of substances that are copper sulfide, copper ions, and copper pentavalent arsenic compounds as catalysts. Moreover, the present inventors confirmed that 99% or more of the trivalent arsenic is oxidized to a pentavalent form at the stop of this oxidation reaction, and have thus achieved the present invention.

In other words, a first means for resolving the aforementioned problems is an arsenic removal method, comprising: a leaching step of leaching a non-ferrous smelting intermediate comprising a copper arsenic compound in the form of an intermetallic compound in the presence of monatomic sulfur, and obtaining a leaching solution comprising arsenic; a solution adjusting step of oxidizing trivalent arsenic in the leaching solution to pentavalent arsenic, and obtaining an adjusted solution; and a crystallizing step of converting the arsenic in the adjusted solution to scorodite, the leaching step comprising forming a slurry from a mixture of the non-ferrous smelting intermediate and monatomic sulfur, and performing one or more actions selected from blowing in of air, blowing in of oxygen gas, blowing in of a gas mixture of oxygen gas and air, and addition of a sulfidizing agent, at a temperature of 50° C. or higher until the redox potential is 250 mV (Ag/AgCl reference electrode) or higher.

The second means is the arsenic removal method according to the first means, wherein the copper arsenic compound comprises one or more type of materials selected from copper arsenide and decoppered electrolytic slime.

The third means is the arsenic removal method according to the first means, wherein in the leaching step, the sulfidizing agent is added at the beginning of the step, and thereafter, one or more actions are performed selected from blowing in of air, blowing in of oxygen gas, and blowing in of a gas mixture of oxygen gas and air.

The fourth means is the arsenic removal method according to the first means, wherein in the leaching step, a portion of the sulfidizing agent is added at the beginning of the step, thereafter, one or more actions are performed selected from blowing in of air, blowing in of oxygen gas, and blowing in of a gas mixture of oxygen gas and air, and then the remaining portion of the sulfidizing agent is added.

The fifth means is the arsenic removal method according to the first means, wherein in the solution adjusting step, hydrogen peroxide is added to the leaching solution at a temperature of 40° C. or higher to oxidize the trivalent arsenic to pentavalent arsenic, and then the leaching solution is brought into contact with metallic copper to remove the residual hydrogen peroxide in the leaching solution.

The sixth means is the arsenic removal method according to the first means, wherein the crystallizing step is performed in a pH range of 1.2 or lower.

The seventh means is the arsenic removal method according to the first means, wherein the crystallizing step comprises adding and dissolving ferrous salt comprising ferrous iron into the adjusted solution, and oxidizing the ferrous salt comprising ferrous iron.

The eighth means is the arsenic removal method according to the first means, wherein the crystallizing step is performed at a temperature of 50° C. or higher.

The ninth means is the arsenic removal method according to the first means, wherein an oxidation reaction in the crystallizing step is performed by blowing in air, oxygen gas, or a gas mixture thereof.

The tenth means is an arsenic oxidation method, wherein air and/or oxygen gas is blown into a solution to oxidize trivalent arsenic in the solution to pentavalent arsenic, the solution containing diarsenic trioxide ($As_2O_3$) and/or arsenous acid ions, being heated to 50° C. or higher, having a pH of not less than 1 in a neutral region, and comprising copper sulfide, copper ions, and a copper pentavalent arsenic compound, trivalent arsenic in the solution is oxidized to pentavalent arsenic.

The eleventh means is an arsenic oxidation method, wherein by blowing air and/or oxygen gas into a solution that contains diarsenic trioxide ($As_2O_3$) and/or arsenous acid ions, is heated to 50° C. or higher, has a pH of not less than 2 in a neutral region, and comprises copper sulfide, trivalent arsenic in the solution is oxidized to pentavalent arsenic, while generating the copper pentavalent arsenic compound by dissolving a portion of the copper sulfide.

The twelfth means is the arsenic oxidation method according to the tenth or eleventh means, wherein the pH is not less than 2 when the blowing of air and/or oxygen gas starts, and less than 2 when the blowing of air and/or oxygen gas ends.

The thirteenth means is the arsenic oxidation method according to any of the tenth to twelfth means, wherein after the trivalent arsenic in the solution is oxidized to the pentavalent arsenic, the solution produced by pulp is filtered and a filtering residue is recovered, and the filtering residue is used as a substitute for the copper sulfide.

The fourteenth means is the arsenic oxidation method according to any of the tenth to thirteenth means, wherein after the trivalent arsenic in the solution is oxidized to the pentavalent arsenic, the solution produced by pulp is neutralized to bring the pH to not less than 3 and thereby crystallize the copper ions in the solution as the copper pentavalent arsenic compound, and then filtering is performed to recover a filtrate and a filtering residue, and the filtering residue is used as a substitute for the copper sulfide.

Effects of the Invention

According to any of the first to ninth means, easily filterable and stable scorodite crystals can be easily produced with good reproducibility and without complicated operations by processing the copper arsenic compounds in the form of an intermetallic compound that is included in non-ferrous smelting intermediate. Furthermore, the scorodite crystals produced can meet the leaching standard (conformance to Japanese Environmental Agency Notice 13).

Also, according to any of the tenth to fourteenth means, trivalent arsenic can be oxidized to pentavalent arsenic at an oxidation rate of 99% or more with low operation costs and low equipment costs, by using materials that are easily obtainable in non-ferrous smelters. Furthermore, according to the present invention, the pH of the solution at the stop of the oxidation reaction is not less than 1 and below 2, which is favorable for producing scorodite ($FeAsO_4 \cdot 2H_2O$). In this respect, too, the present invention contributes to low operation costs and low equipment costs.

Best Form for Carrying Out the Invention

As described above, the present invention relates to an arsenic processing method comprising a leaching step of fixing copper as a sulfide and then leaching arsenic from non-ferrous smelting intermediates that include arsenic copper compounds in the form of an intermetallic compound into solution by the use of an oxidizing agent in the presence of sulfur; a solution adjusting step of oxidizing trivalent arsenic to pentavalent arsenic by adding an oxidizing agent to the leaching solution; and a crystallizing step of converting arsenic in the adjusted solution to scorodite crystals.

The present invention also relates to a method of oxidizing trivalent arsenic to pentavalent arsenic at an oxidation rate of 99% or more with low operation costs and low equipment costs.

Hereinafter, with regard to a first embodiment, the 1. Non-ferrous smelting intermediates containing a copper arsenic compound in the form of an intermetallic compound; 2. Leaching step; 3. Solution adjusting step; and 4. Crystallizing step; and Examples 1 to 4 and Comparative Examples 1 to 3 will be described in order in detail while referring to the flowchart shown in FIG. 1.

Next, with regard to the method of oxidizing trivalent arsenic to pentavalent arsenic at an oxidation rate of 99% or more with low operation costs and low equipment costs as a second embodiment, the 1. Processing object; 2. Oxidation reaction of trivalent arsenic; 3. pH of the trivalent arsenic at the beginning of the oxidation reaction; 4. pH of the trivalent arsenic at the stop of the oxidation reaction; and Examples 5 to 9 and Comparative Examples 4 to 8 will be described in order in detail while referring to the flowchart shown in FIG. 3, and further the 5. Trivalent arsenic oxidation reaction model conceived by the present inventors will be described.

First Embodiment

1. Non-Ferrous Smelting Intermediates Containing Arsenic Copper Compound in the Form of an Intermetallic Compound The non-ferrous smelting intermediates containing copper arsenic compound (1) according to the present invention refers to a substance where copper and arsenic form a "copper arsenic compound" in the form of an intermetallic compound. Copper arsenide and decoppered electrolytic slime and the like can be suggested as the non-ferrous smelting intermediates containing a copper arsenic compound. It should be obvious here that copper and arsenic may not necessarily be in the form of an intermetallic compound.

2. Leaching Step

Conventionally, leaching arsenic into water from non-ferrous smelting intermediates containing a copper arsenic compound using an oxidation reaction without adding an alkali was thought to be extremely difficult. This was because without adding an alkali, not only the arsenic, but also the copper would be ionized, and the arsenic would then precipitate out as copper arsenate.

As a result of diligent research, the present inventors have discovered that arsenic can be leached into a leaching solution (3) from a copper arsenic compound if the leaching step (2) is performed in the presence of monatomic sulfur.

In other words, in the leaching step (2) of the present invention, an oxidizing agent is added in and mixed with a slurry where a substance containing a copper arsenic compound is suspended in water in the presence of monatomic sulfur, causing an arsenic leaching reaction to proceed while controlling the copper leaching reaction, and after the leaching reaction is complete, separating the slurry into solids and liquids, and recovering the leaching solution (3).

Furthermore, in the leaching step (2) of the present invention, mixing a slurry where a substance containing a copper arsenic compound is suspended in water as is, or adding and mixing an oxidizing agent to the slurry, in the presence of monatomic sulfur, causing an arsenic leaching reaction to proceed while controlling the copper leaching reaction, and after the leaching reaction is complete, separating the slurry into solids and liquids, and recovering the leaching solution (3), is also a preferable constitution. The arsenic leaching reaction is performed in conjunction with the copper sulfidation. Furthermore, the amount of sulfur added is preferably not less than 1 equivalent based on the amount of copper in the substance containing a copper arsenic compound. Note, a gas containing oxygen gas (for example pure oxygen gas) can be used as the oxidizing agent.

In addition, the present inventors have also conducted investigations focusing on the relationship between the arsenic leaching rate and the redox potential of the leaching solution. The results of this investigation are shown in FIG. 2.

FIG. 2 is a graph showing the leaching rate of each element and the redox potential on the vertical access, and the time for the leaching operation on the horizontal axis, where arsenic is plotted as □ connected by a solid line, iron is plotted as ○ connected by a single dash line, copper is plotted as Δ connected by a double dash line, and the redox potential is plotted as ◇ connected by a double line.

As can be seen from the results of FIG. 2, there is a strong correlation between the leaching rate of arsenic and the redox potential of the leaching solution. In other words, in the leaching step (2), the objective is to obtain a recovery solution with a high concentration of arsenic with good productivity, and therefore the leaching is preferably performed while increasing the redox potential to be 200 mV (Ag/AgCl reference electrode) or higher, and preferably 300 mV (Ag/AgCl reference electrode) or higher.

The aforementioned discovery achieved by the present inventors will be described in further detail.

When leaching arsenic directly from a compound containing arsenic into a leaching solution (3), an oxidizing agent must be added in order to promote the oxidation reaction. For a substance containing arsenic in the form of a sulfide, arsenic can be leached into the water by the action of the oxidizing agent under prescribed conditions. However, for copper arsenic compounds which are intermetallic compounds, the arsenic will normally precipitate out with copper if an oxidizing agent is used under acidic conditions.

In other words, the copper will become copper ions and the arsenic will become arsenic ions, copper arsenate will form, and the arsenic will precipitate out.

However, in the presence of monatomic sulfur, arsenic can be leached (dissolved) into the leaching solution (3) when the copper arsenic compound is acted on by the oxidizing agent.

This is thought to be because the arsenic oxidation dissolution reaction and the copper sulfidation reaction are occurring simultaneously. The present inventors have conceived of a reaction (Equation 1) that occurs in the presence of monatomic sulfur.

$$2Cu_3As + 6S + 5(O) + 3H_2O = 3CuS + 2H_3AsO_4 \quad \text{(Equation 1)}$$

In other words, the oxidizing agent and this sulfurizing agent act simultaneously on the copper arsenic compound, and the arsenic undergoes oxidation leaching (dissolution) at the same time as sulfidation of the copper is proceeding. As a result, the copper forms copper sulfide, and subsequently is not leached into the leaching solution (3), which is preferable. Furthermore, the leaching residue (7) that contains copper sulfide is processed in a copper smelting step (8).

Incidentally, if the grade of copper is higher than the grade of arsenic in the copper arsenic compound, leaching of the copper may be difficult to suppress in the presence of only monatomic sulfur. This is thought to be because the redox potential of the solution is already at a high value prior to blowing, for the case where blowing air, oxygen gas, or a gas mixture of the air and oxygen gas is used as an oxidizing agent. In other words, the reactivity of copper ions and sulfur ions is thought to be significantly lower when the redox potential is high.

Therefore, a method of adding metallic zinc or metallic iron in order to suppress the leaching of the copper was conceived. However, with this method, there is a concern that toxic arsine gas will be produced because of a reaction between the zinc, iron, and arsenic ions. Subsequently, a method of blowing a sulfurous acid gas was conceived. However, with this method, the concentration of sulfuric acid in the leaching solution will increase because of the water solubility of the sulfurous acid gas that is blown, and therefore neutralization is necessary in a subsequent step.

At this point, the present inventors conceived of a method of precipitating and separating the copper ions from the leached copper as copper sulfide, by adding a sulfidizing agent other then monatomic sulfur, such as sodium sulfide, sodium hydrogen sulfide, or hydrogen sulfide. Furthermore, it was discovered that sulfidation separation of the copper ions could also be performed in a step subsequent to the leaching step (2) such as in the solution adjusting step (4). However, the sulfides produced in the leaching step (2) are coarse and readily precipitate, and can easily be filtered, so performing in the presence of the leaching residue (7) in the leaching step (2) is preferable.

3. Solution Adjusting Step

The solution adjusting step (4) is a step comprising adding an oxidizing agent to the leaching solution (3) obtained in the aforementioned "2. Leaching Step", oxidizing the arsenic that was dissolved in a trivalent state to pentavalent arsenic by adding an oxidizing agent, and subsequently removing the oxidizing agent that remains in solution.

First, the oxidizing agent will be described.

Generally, oxidizing trivalent arsenic to pentavalent arsenic is easier in the neutral region than in the acidic region, and even easier in the alkaline region than the neutral region. However, the leaching solution of the present invention is acidic. Therefore, adding an alkali (such as sodium hydroxide) to the acidic leaching solution and oxidizing the arsenic in an alkaline solution could be conceived. However, according to the research of the present inventors, a large amount of an alkali additive is required to make the solution properties alkaline, and in addition to the economic disadvantages, increasing the concentration of salts in the solution is thought to have a negative effect on the production of scorodite (6) in a subsequent step.

Subsequently, the present inventors investigated oxidizing the arsenic using oxygen gas in a neutral region (pH between 6 and 7). However, the oxidation of arsenic was found to be insufficient. Therefore, use of copper catalyst was examined. This examination result will be explained in a second embodiment as will be described later.

At this point, the present inventors considered the use of hydrogen peroxide ($H_2O_2$) as an oxidizing agent. When hydrogen peroxide was used during the investigation to oxidize the arsenic under acidic conditions, sufficient oxidation was confirmed. However, the residual hydrogen peroxide in the solution after the arsenic oxidation reaction would oxidize a portion of the ferrous ($Fe^{2+}$) salt that is added in the subsequent crystallizing step (5), and therefore it is preferable to remove the residual hydrogen peroxide in order to accurately manage the ferrous ion concentration.

The present inventors then evaluated a method of processing the hydrogen peroxide remaining in the solution. First, a metal colloid of gold or silver or the like was added in an attempt to decompose and remove the residual hydrogen peroxide. However, the method of adding a precious metal colloid has high raw material costs, and losses due to handling and the like can be conceived, so implementation was difficult. Therefore, the present inventors came up with a revolutionary concept of bringing the residual hydrogen peroxide into contact with metallic copper in order to remove by consumption rather than by decomposition, and thus succeeded in removing the residual hydrogen peroxide.

The details will be described below.

First, the hydrogen peroxide that can be used is a standard product with a concentration between 30 and 35%.

Oxidation of trivalent arsenic to pentavalent arsenic under acidic conditions is thought to proceed as shown below in (Equation 2) and (Equation 3).

$$HAsO_2 + H_2O_2 = H_3AsO_4 \qquad \text{(Equation 2)}$$

$$HAsO_2 + H_2O_2 = H_2AsO_4^- + H^+ \qquad \text{(Equation 3)}$$

The amount of hydrogen peroxide added is preferably between 1 and 1.2 times the reaction equivalent weight based on the concentration of trivalent arsenic and (Equation 2) and (Equation 3). Furthermore, if the concentration of trivalent arsenic is unknown, achieving a redox potential of the solution at 80° C. that is not less than 500 mV (VS: Ag/AgCl) after adding the hydrogen peroxide provides a good estimate.

The time required for adding the hydrogen peroxide depends on the concentration of trivalent arsenic to be oxidized. For example, if the concentration of trivalent arsenic to be oxidized is 20 g/L, the time required for adding is preferably not less than 5 minutes. Taking sufficient time for adding can help prevent a portion of the hydrogen peroxide from rapidly decomposing, generating a large amount of gas bubbles, and degrading the effect of addition. An addition time of between 10 and 15 minutes is even more preferable.

The oxidation of trivalent arsenic to pentavalent arsenic by the addition of hydrogen peroxide is extremely fast, and an increase in the temperature due to the heat of reaction as well as a reduction in the pH can be observed. Furthermore, the reaction time is preferably not less than 60 minutes, from the perspective of achieving complete oxidation, and the reaction is preferably completed once the redox potential of the solution drops to 450 mV (VS; Ag/AgCl) or less.

The hydrogen peroxide remaining after the oxidation reaction of the arsenic is removed by bringing into contact with metallic copper. Specifically, a standard method is to add and mix copper powder into the solution in order to cause a reaction. Furthermore, this objective can also be achieved by passing the solution through a column filled with copper plate or copper filings in order to simplify actual plant operations.

The solution temperature is preferably 40° C. or higher in order to complete the reaction.

The removal reaction is thought to proceed as shown below in (Equation 4).

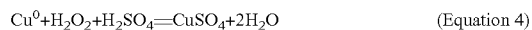

$$Cu^0 + H_2O_2 + H_2SO_4 = CuSO_4 + 2H_2O \qquad \text{(Equation 4)}$$

As a result, the removal reaction will proceed in conjunction with an increase in the pH, and can be considered to be complete when the pH reaches a certain value.

In the solution adjusting step (4) of the present invention, the trivalent arsenic can be oxidized to pentavalent arsenic without a complex operation even if the leaching solution (3) is in the acidic zone, and therefore the high efficiency of converting arsenic to scorodite (6) in a subsequent step can be maintained.

4. Crystallizing Step

The crystallizing step (5) is a step of crystallizing the pentavalent arsenic in the leaching solution (3) obtained in the aforementioned "3. Solution adjusting step" to scorodite (6).

The leaching solution after the aforementioned solution adjusting step (4) is completed (arsenic solution after solution adjustment processing) is preferably a concentrated solution with an arsenic concentration of 20 g/L or higher, and more preferably 30 g/L or higher, in view of the productivity of scorodite.

First, sulfuric acid ($H_2SO_4$) is added at room temperature to the arsenic solution after the solution adjustment process, and after adjusting the pH to 1, ferrous salt ($Fe^{2+}$) is added and dissolved. At this point, various types of ferrous compounds are possible, but ferrous sulfate is preferable from the perspective of corrosion resistance of the equipment and because of the ease of procurement.

The amount of ferrous salt, calculated as pure Fe, added is equal to or greater than one times and preferably 1.5 times the number of moles of arsenic to be treated.

After adding the ferrous salt, the arsenic solution that has undergone solution adjustment is heated to a prescribed reaction temperature. At this time, the scorodite (6) can be deposited if the reaction temperature is at least 50° C. However, a higher reaction temperature is preferable from the perspective of increasing the scorodite particle size. Furthermore, the reaction temperature is preferably between 90 and 100° C., from the perspective of enabling the reaction under atmospheric conditions.

When the solution adjustment processed arsenic solution reaches a prescribed reaction temperature, blowing of air, oxygen gas, or a gas mixture thereof is started, a gas liquid mixture is created by a vigorous mixing, and a high temperature oxidation reaction proceeds while maintaining a prescribed reaction temperature.

The high temperature oxidation reaction is thought to proceed according to the following (Equation 5) to (Equation 10) for approximately 2 to 3 hours.

(First Half of Reaction)

$$2FeSO_4 + \tfrac{1}{2}O_2 + H_2SO_4 = Fe_2(SO_4)_3 + H_2O \qquad \text{(Equation 5)}$$

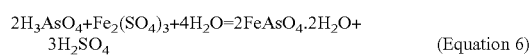

$$2H_3AsO_4 + Fe_2(SO_4)_3 + 4H_2O = 2FeAsO_4 \cdot 2H_2O + 3H_2SO_4 \qquad \text{(Equation 6)}$$

The complete reaction (Equation 5 and Equation 6) is shown below as (Equation 7).

$$2H_3AsO_4 + 2FeSO_4 + \tfrac{1}{2}O_2 + 3H_2O = 2FeAsO_4 \cdot 2H_2O + 2H_2SO_4 \quad \text{(Equation 7)}$$

(Second Half of the Reaction After the as Concentration Drops)

$$2FeSO_4 + \tfrac{1}{2}O_2 + H_2SO_4 = Fe_2(SO_4)_3 + H_2O \quad \text{(Equation 8)}$$

$$\tfrac{2}{3}H_3AsO_4 + \tfrac{1}{3}Fe_2(SO_4)_3 + 4/3 H_2O = \tfrac{2}{3}FeAsO_4 \cdot 2H_2O + H_2SO_4 \quad \text{(Equation 9)}$$

The complete reaction (Equation 8 and Equation 9) is shown below as (Equation 10).

$$\tfrac{2}{3}H_3AsO_4 + 2FeSO_4 + \tfrac{1}{2}O_2 + 4/3 H_2O = \tfrac{2}{3}FeAsO_4 \cdot 2H_2O + \tfrac{2}{3}Fe_2(SO_4)_3 \quad \text{(Equation 10)}$$

Although dependent on the oxidation method, the pH, arsenic concentration, and Fe concentration will drop rapidly between 2 and 3 hours after the start of the high temperature oxidation reaction. At this stage, the redox potential of the solution is 400 mV or higher (VS; Ag/AgCl) at 95° C. Furthermore, 90% or more of the arsenic that is contained will be in the form of scorodite (6) crystals. After 3 or more hours from the start of the high temperature oxidation reaction, the arsenic remaining in solution will drop to minimal levels, but there will be almost no change in the pH and the solution potential. Note, the high temperature oxidation reaction is preferably continued for between 5 and 7 hours in order to reach perfect equilibrium.

Using the aforementioned crystallizing step (4) of the present invention, the reaction operation will be simple, the pH will not need to be adjusted at an intermediate point, and the arsenic that is present can be positively converted to scorodite (6) crystals.

The scorodite (6) crystals that are obtained have excellent precipitating and filtering properties, and the adsorbed water content after filtering will only be approximately 10%, while the arsenic grade will be up to 30%, so a reduction in volume can be achieved, and furthermore, the scorodite crystals are stable, with excellent dissolution resistance. Therefore, the arsenic can be removed from the smelting process and stored in a stable form.

EXAMPLES

The present invention will be described below more specifically while presenting Examples.

Example 1

1. Non-Ferrous Smelting Intermediates Containing Arsenic Copper Compound in the Form of an Intermetallic Compound As the non-ferrous smelting intermediate containing a copper arsenic compound in the form of an intermetallic compound, copper residue which copper and arsenic were recovered as copper arsenide by zinc powder substitution during the zinc smelting process was prepared. The amount of each of the elements contained in the copper residue is shown in Table 1.

TABLE 1

|  | Element | | | | | | | Water content (%) |
|---|---|---|---|---|---|---|---|---|
|  | As (%) | Cu (%) | Fe (%) | Sb (%) | Zn (%) | Pb (%) | Cd (%) |  |
| Content | 22.96 | 50.08 | 1.65 | 2.95 | 0.54 | 0.12 | 0.12 | 9 |

2. Leaching Step 380 wet g of copper arsenic compound was measured in a 2 L beaker, 1.4 L of pure water was added to repulp. After adding 18 g of sulfuric acid to the repulp, 2 equivalents of monatomic sulfur was added, based on the copper content, and the solution was heated while mixing to a temperature of 80° C. At this time, the pH of the mixture was 1.5, and the redox potential was −11 mV. Note, the redox potential was measured using an Ag/AgCl electrode (same hereinafter for the Examples and comparative Examples).

At this time, the mixture was maintained at a temperature of 80° C. and oxygen gas was blown in at a rate of 400 cc/min while vigorously mixing, and leaching was performed for 3 hours. The redox potential at this time was 360 mV. The amount of the various elements present in the leaching solution obtained and the leaching rate for each element is shown in Table 2.

As can be seen from the results of Table 2, the concentration of arsenic in the leaching solution was high at 48.8 g/L, but in contrast, the leaching of other metal elements, and especially copper could be sufficiently suppressed. Furthermore, the concentration of trivalent arsenic in the leaching solution obtained was 20 g/L.

TABLE 2

|  | Element | | | | | | | | Potential |
|---|---|---|---|---|---|---|---|---|---|
|  | As | Cu | Fe | Sb | Zn | Pb | Cd | FA |  |
| Content | (g/l) | (g/l) | (g/l) | (g/l) | (g/l) | (g/l) | (g/l) | (mg/l) | (mV) |
|  | 48.8 | 0.7 | 1.3 | 0.2 | 1.8 | 0.02 | 0.22 | 34 | 365 |
| Leaching Ratio | (%) 88 | (%) 1 | (%) 35 | (%) 3 | (%) 97 | (%) 8 | (%) 75 | — | — |

(Note)
In the table, g/L and mg/L have the same meaning as g/L and mg/L in the document body.

3. Solution Adjusting Step 900 cc of the aforementioned leaching solution was placed in a 1 L beaker, and hydrogen peroxide was added while mixing. Note, the amount of hydrogen peroxide added was 1.15 times the number of equivalents necessary to oxidize the trivalent arsenic that is included.

Specifically, 32.3 g of a 30% aqueous solution of $H_2O_2$ was added for 10 minutes starting from the moment the temperature of the leaching solution reached 40° C. while the temperature was rising.

The redox potential of the solution after this addition is completed was 584 mV (Ag/AgCl) at 70° C., and the final solution was obtained after continuing to mix for 20 minutes. Note, the mixing was performed to the degree that air did not get mixed in. The redox potential of the final solution dropped to 530 mV, and the concentration of trivalent arsenic was 2.2 g/L.

The temperature of the final solution was adjusted to 40° C., and 3.7 g of copper powder was added to 900 cc of the solution. The reaction was completed in a short period of time, and the adjusted solution was obtained. The concentration of copper in the adjusted solution was 1.0 g/L, an increase of approximately 0.3 g/L compared to the final solution. The changes in the reaction are shown in Table 3. Note, the copper powder that is added can be repeatedly used until completely dissolved.

TABLE 3

|  | Time lapse (min) | | |
| --- | --- | --- | --- |
|  | 0 (start) | 1 (copper powder added) | 2.5 (Final) |
| Temperature (° C.) | 41 | 42 | 42 |
| pH | 1.09 | 1.10 | 1.1 |
| Redox potential (mV) | 493 | 185 | 88 |

4. Crystallizing Step

The adjusted solution was diluted with pure water, and the concentration of arsenic was adjusted to 45 g/L. 800 cc of the adjusted solution where the arsenic concentration was adjusted was transferred to a 2 L beaker, and ferrous salt ($Fe^{2+}$) was added. The number of moles of ferrous salt that was added was 1.5 times the number of moles of arsenic.

Specifically, 200 g of extra pure reagent ferrous sulfate ($FeSO_4$ $7H_2O$) was weighed and dissolved in the adjusted solution, and then 95% sulfuric acid was added to bring the pH to 1.0 at a temperature of 30° C. Subsequently, the solution was heated to 95° C., oxygen gas was started to be blown in at a rate of 950 cc/min using a glass tube from the bottom of the beaker, a high temperature oxidation reaction was induced for 7 hours under vigorous mixing to make a gas and liquid mixture, and a scorodite precipitate was produced. The analysis results of the scorodite obtained are shown in Table 4. The scorodite obtained had low water content and high cleaning efficiency, and the leaching values were also good result, in conformance with the Japanese Environmental Agency Notice 13.

TABLE 4

| As precipitation ratio | Scorodite | | | | | | | |
| --- | --- | --- | --- | --- | --- | --- | --- | --- |
|  | Water content | Composition (%) | | | Leaching value (mg/L) | | | |
| (Note 1) (%) | (%) | As | Fe | Sb | As (Note 2) | Pb | Cd | Hg |
| 92.8 | 8.3 | 30.89 | 25.09 | 0.25 | 0.01 | <0.01 | <0.01 | <0.005 |

(Note 1) As precipitation ratio: Ratio of arsenic in the solution converted to scorodite
(Note 2) In conformance with the as leaching value in Notice 13 from the Japanese Environmental Agency
(Note)
In the table, mg/L has the same meaning as mg/L in the document body.

Example 2

1. Non-Ferrous Smelting Intermediates Containing Arsenic Copper Compound in the Form of an Intermetallic Compound Decoppered electrolytic slime was prepared as the non-ferrous smelting intermediate containing an arsenic copper compound in the form of an intermetallic compound. The amount of each of the elements contained in the decoppered electrolytic slime is shown in Table 5.

TABLE 5

|  | Element | | | | | | | Water |
| --- | --- | --- | --- | --- | --- | --- | --- | --- |
|  | As (%) | Cu (%) | Fe (%) | Sb (%) | Zn (%) | Pb (%) | Cd (%) | content (%) |
| Content | 30.46 | 37.14 | 0.03 | 3.06 | 0.05 | 2.51 | 0.01 | 5 |

2. Leaching Step 252 wet g of copper arsenic compound was measured in a 2 L beaker, 1.4 L of pure water was added to repulp. After adding 18 g of sulfuric acid to the repulp, 90 g of monatomic sulfur equal to 2 equivalent amounts based on the total copper content was added, and the solution was heated while mixing to a temperature of 80° C. At this time, the pH of the mixture was 1.6, and the redox potential was +50 mV.

The mixture was maintained at a temperature of 80° C. and oxygen gas was blown in at a rate of 400 cc/min while vigorously mixing, and leaching was performed for 3 hours. The redox potential at this time was 370 mV. The amount of the various elements present in the leaching solution obtained and the leaching rate for each element is shown in Table 6.

As can be seen from the results of Table 6, the concentration of arsenic in the leaching solution was high at 48.6 g/L, but in contrast, the leaching of other metal elements, and especially copper could be sufficiently suppressed. Furthermore, the concentration of trivalent arsenic in the leaching solution obtained was 2.8 g/L.

TABLE 6

|  | Element | | | | | | | | |
| --- | --- | --- | --- | --- | --- | --- | --- | --- | --- |
|  | As | Cu | Fe | Sb | Zn | Pb | Cd | FA | Potential |
| Content | (g/l) | (g/l) | (g/l) | (g/l) | (g/l) | (g/l) | (g/l) | (mg/l) | (mV) |
|  | 48.6 | 1.7 | 0.0 | 0.2 | 0.1 | 0.03 | 0.01 | 32 | 360 |
| Leaching Ratio | (%) | (%) | (%) | (%) | (%) | (%) | (%) | — | — |
|  | 94 | 3 | 0 | 4 | 96 | 1 | 90 |  |  |

(Note)
In the table, g/L and mg/L have the same meaning as g/L and mg/L in the document body.

3. Solution Adjusting Step 900 cc of the aforementioned leaching solution was placed in a 1 L beaker, and hydrogen peroxide was added while mixing. The amount of hydrogen peroxide added was 1.15 times the number of equivalents necessary to oxidize the trivalent arsenic that is included.

Specifically, 5.1 g of a 30% aqueous solution of $H_2O_2$ was added over 10 minutes beginning from the moment the temperature of the leaching solution reached 40° C. while the temperature was rising. The redox potential of the solution after this addition is completed was 584 mV (Ag/AgCl) at 70° C., and the final solution was obtained after continuing to mix for 20 minutes. Note, the mixing was performed to the degree that air did not get mixed in.

The redox potential of the final solution dropped to 538 mV, and the concentration of trivalent arsenic was 0.4 g/L.

The temperature of the final solution was adjusted to 40° C., and 3.7 g of copper powder was added to 900 cc of the solution. The reaction was completed in a short period of time, and the preparation was obtained. The concentration of copper in the adjusted solution was 1.9 g/L, an increase of approximately 0.2 g/L compared to the final solution. The changes in the reaction are shown in Table 7.

TABLE 7

|  | Time lapse (min) | | |
| --- | --- | --- | --- |
|  | 0 (start) | 1 (copper powder added) | 2.5 (Final) |
| Temperature (° C.) | 41 | 41 | 41 |
| pH | 1.05 | 1.05 | 1.05 |
| Redox potential (mV) | 503 | 185 | 88 |

4. Crystallizing Step

The adjusted solution was diluted with pure water, and the concentration of arsenic was adjusted to 45 g/L. 800 cc of the adjusted solution where the arsenic concentration was adjusted was transferred to a 2 L beaker, and ferrous salt ($Fe^{2+}$) was added. The number of moles of ferrous salt that was added was 1.5 times the number of moles of arsenic.

Specifically, 200 g of extra pure reagent ferrous sulfate ($FeSO_4$ $7H_2O$) was weighed and dissolved in the adjusted solution, and then 95% sulfuric acid was added to bring the pH to 1.0 at a temperature of 30° C. Subsequently, the solution was heated to 95° C., oxygen gas was started to be blown in at a rate of 950 cc/min using a glass tube from the bottom of the beaker, and a high temperature oxidation reaction was induced for 7 hours under vigorous mixing to make a gas and liquid mixture. Thus a white precipitate of scorodite was produced. The analysis results of the scorodite obtained are shown in Table 8. The analysis results of the scorodite obtained are shown in Table 8. The scorodite obtained had low water content and high cleaning efficiency, and the leaching values were also favorable, in conformance with the Japanese Environmental Agency Notice 13.

TABLE 8

| As precipitation ratio (Note 1) (%) | Water content (%) | Scorodite | | | | | | |
| --- | --- | --- | --- | --- | --- | --- | --- | --- |
| | | Composition (%) | | | Leaching value (mg/L) | | | |
| | | As | Fe | Sb | As (Note 2) | Pb | Cd | Hg |
| 97 | 10.3 | 30.47 | 24.35 | 0.23 | 0.03 | <0.01 | <0.01 | <0.005 |

(Note 1) As precipitation ratio: Ratio of arsenic in the solution converted to scorodite
(Note 2) In conformance with the as leaching value in Notice 13 from the Japanese Environmental Agency
(Note)
In the table, mg/L has the same meaning as mg/L in the document body.

Example 3

1. Non-Ferrous Smelting Intermediates Containing an Arsenic Copper Compound in the Form of an Intermetallic Compound Decoppered electrolytic slime was used similar to Example 2, but the lot was different, and the raw material prepared had a higher grade of copper than in Example 2. The amount of each of the elements contained in the decoppered electrolytic slime is shown in Table 9.

TABLE 9

|  | Element | | | | | | | Water |
| --- | --- | --- | --- | --- | --- | --- | --- | --- |
|  | As (%) | Cu (%) | Fe (%) | Sb (%) | Zn (%) | Pb (%) | Cd (%) | content (%) |
| Content | 19.38 | 52.64 | 0.17 | 1.05 | 0.05 | 1.00 | 0.15 | 6 |

2. Leaching Step 402 wet g of copper arsenic compound was measured in a 2 L beaker, 1.4 L of pure water was added to repulp. After adding 18 g of sulfuric acid to the repulp, 199 g of monatomic sulfur equal to 2 equivalent amounts based on the total copper content was added, and the solution was heated while mixing to a temperature of 80° C. At this time, the pH of the mixture was 1.5.

At this time, 66 g (purity 50%) of sodium sulfate corresponding to 1.2 equivalents was added to the copper ions which had been leached. The redox potential after 30 minutes had passed from the addition was 247 mV.

The mixture was maintained at a temperature of 80° C., and leaching was continued for 3 hours without blowing oxygen gas. The redox potential at this time was 310 mV. The amount of the various elements present in the leaching solution obtained and the leaching rate for each element is shown in Table 10.

As can be seen from the results of Table 10, the leaching ratio of arsenic into the leaching solution was only slightly lower at 80.6%, but the concentration was 42.2 g/L, which was sufficient to supply to the next step. Furthermore, it was determined that leaching of other metal elements such as copper could be sufficiently suppressed.

As a result, it was determined that the copper ions that leached into the leaching solution could be fixed as copper sulfide and separated from the arsenic by using a combination of monatomic sulfur with a small amount of sulfidizing agent.

TABLE 10

| | Element | | | | | | | | |
|---|---|---|---|---|---|---|---|---|---|
| | As | Cu | Fe | Sb | Zn | Pb | Cd | FA | Potential |
| Content | (g/l) | (g/l) | (g/l) | (g/l) | (g/l) | (g/l) | (g/l) | (mg/l) | (mV) |
| | 49.3 | 3.0 | 0.0 | 0.2 | 0.1 | 0.03 | 0.29 | 36 | 339 |
| Leaching | (%) | (%) | (%) | (%) | (%) | (%) | (%) | — | — |
| Ratio | 94 | 2 | 0 | 8 | 93 | 1 | 72 | | |

(Note)
In the table, g/L and mg/L have the same meaning as g/L and mg/L in the document body.

3. Solution Adjusting Step
This step was performed in accordance with Example 1 or 2.

4. Crystallizing Step
This step was performed in accordance with Example 1 or 2.

Example 4

1. Non-Ferrous Smelting Intermediates Containing an Arsenic Copper Compound in the Form of an Intermetallic Compound Decoppered electrolytic slime was prepared similar to Example 3.

2. Leaching Step 402 wet g of copper arsenic compound was measured in a 2 L beaker, 1.4 L of pure water was added to repulp. After adding 18 g of sulfuric acid to the repulp, 199 g of monatomic sulfur equal to 2 equivalent amounts based on the total copper content was added, and the solution was heated while mixing to a temperature of 80° C. At this time, the pH of the mixture was 1.5, and the redox potential was −11 mV.

At this time, 66 g (purity 50%) of sodium sulfate corresponding to 1.2 equivalents was added to the copper ions which had been leached.

The mixture was maintained at a temperature of 80° C. and oxygen gas was blown in at a rate of 400 cc/min while leaching was performed for 3 hours. The redox potential at this time was 377 mV. The amount of the various elements present in the leaching solution obtained and the leaching rate for each element is shown in Table 11.

As can be seen from the results of Table 11, the concentration of arsenic in the leaching solution was high at 49.3 g/L, but in contrast, the leaching of other metal elements, and especially copper could be sufficiently suppressed.

As a result, the arsenic leaching ratio increased above Example 3 to 94.3% by blowing in oxygen gas and adding a sulfidizing agent.

TABLE 11

| | Element | | | | | | | | |
|---|---|---|---|---|---|---|---|---|---|
| | As | Cu | Fe | Sb | Zn | Pb | Cd | FA | Potential |
| Content | (g/l) | (g/l) | (g/l) | (g/l) | (g/l) | (g/l) | (g/l) | (mg/l) | (mV) |
| | 42.2 | 1.0 | 0.0 | 0.1 | 0.1 | 0.02 | 0.24 | 36 | 339 |
| Leaching | (%) | (%) | (%) | (%) | (%) | (%) | (%) | — | — |
| Ratio | 81 | 1 | 0 | 3 | 98 | 1 | 60 | | |

(Note)
In the table, g/L and mg/L have the same meaning as g/L and mg/L in the document body.

3. Solution Adjusting Step
This step was performed in accordance with Example 1 or 2.

4. Crystallizing Step
This step was performed in accordance with Example 1 or 2.

Comparative Example 1

1. Non-Ferrous Smelting Intermediates Containing Arsenic Copper Compound in the Form of an Intermetallic Compound Copper residue was prepared similar to Example 1.

2. Leaching Step 380 wet g of copper arsenic compound was measured in a 2 L beaker, 1.4 L of pure water was added to repulp. Furthermore, while continuing to mix lightly, 400 g of sulfuric acid was added and the temperature was increased to 80° C. Subsequently, the mixing was changed to vigorous mixing, and oxygen gas was blown in at a rate of 400 cc/min using a glass tube from the bottom of the beaker, and leaching was performed for 3 hours. The amount of the various elements present in the leaching solution obtained and the leaching rate for each element is shown in Table 12.

As can be seen from the results in Table 12, the concentration of arsenic, the concentration of copper, and the concentration of iron in the leaching solution was high, and a separation of the metal elements was not possible. Furthermore, the residual acid in the leaching solution was determined to be high.

As a result of these results, the step of treating the non-ferrous smelting intermediate containing a copper arsenic compound in the form of an intermetallic compound was stopped.

TABLE 12

| | Element | | | | | | | | |
|---|---|---|---|---|---|---|---|---|---|
| | As | Cu | Fe | Sb | Zn | Pb | Cd | FA | Potential |
| Content | (g/l) 53.4 | (g/l) 121.0 | (g/l) 3.2 | (g/l) 5.3 | (g/l) 1.4 | (g/l) 0.02 | (g/l) 0.27 | (mg/l) 90 | (mV) 480 |
| Leaching Ratio | (%) 96 | (%) 100 | (%) 85 | (%) 76 | (%) 97 | (%) 8 | (%) 90 | — | — |

(Note)
In the table, g/L and mg/L have the same meaning as g/L and mg/L in the document body.

Comparative Example 2

1. Non-Ferrous Smelting Intermediates Containing an Arsenic Copper Compound in the Form of an Intermetallic Compound Copper residue was prepared similar to Example 1.

2. Leaching Step

Leaching was performed without adding any monatomic sulfur or sodium sulfate whatsoever.

Similar to Example 1, 380 wet g of copper arsenic compound was measured in a 2 L beaker, and 1.4 L of pure water was added to repulp. Furthermore, 18 g of sulfuric acid was added and the temperature was increased to 80° C. while mixing. In addition, oxygen gas was blown in at a rate of 400 cc/min while mixing vigorously, and leaching was performed for 3 hours. The redox potential at this time was 323 mV. The amount of the various elements present in the leaching solution obtained and the leaching rate for each element is shown in Table 13.

As can be seen from the results in Table 13, the leaching ratio of arsenic in the leaching solution was only 21%. In addition, it was determined that the copper could not be separated. As a result of these results, the step of treating the non-ferrous smelting intermediate containing a copper arsenic compound in the form of an intermetallic compound was stopped.

TABLE 13

| | Element | | | | | | | | |
|---|---|---|---|---|---|---|---|---|---|
| | As | Cu | Fe | Sb | Zn | Pb | Cd | FA | Potential |
| Content | (g/l) 11.8 | (g/l) 24.2 | (g/l) 0.2 | (g/l) 0.5 | (g/l) 1.7 | (g/l) 0.03 | (g/l) 0.18 | (mg/l) 15 | (mV) 323 |
| Leaching Ratio | (%) 21 | (%) 20 | (%) 5 | (%) 7 | (%) 95 | (%) 10 | (%) 60 | — | — |

(Note)
In the table, g/L and mg/L have the same meaning as g/L and mg/L in the document body.

Comparative Example 3

1. Non-Ferrous Smelting Intermediates Containing Arsenic Copper Compound in the Form of an Intermetallic Compound Copper residue was prepared similar to Example 1.

2. Leaching Step

This step was performed by blowing in only air as an oxidant.

Similar to Example 1, 380 wet g of copper arsenic compound was measured in a 2 L beaker, and 1.4 L of pure water was added to repulp. After adding 18 g of sulfuric acid to the repulp, 156 g of monatomic sulfur equal to 2 equivalent amounts based on the total copper content was added, and the solution was heated while mixing to a temperature of 80° C. In addition, air was blown in at a rate of 2000 cc/min while mixing vigorously, and leaching was performed for 6 hours. The redox potential at this time was 137 mV. The amount of the various elements present in the leaching solution obtained and the leaching rate for each element is shown in Table 14.

As can be seen from the results in Table 14, the leaching of copper was suppressed due to the presence of monatomic sulfur, but the redox potential of the final solution was only 137 mV, so the arsenic leaching ratio was low because of insufficient oxidation.

As a result of these results, the step of treating the non-ferrous smelting intermediate containing a copper arsenic compound in the form of an intermetallic compound was stopped.

TABLE 14

| | Element | | | | | | | | |
|---|---|---|---|---|---|---|---|---|---|
| | As | Cu | Fe | Sb | Zn | Pb | Cd | FA | Potential |
| Content | (g/l) 25.2 | (g/l) 0.0 | (g/l) 3.6 | (g/l) 0.1 | (g/l) 1.7 | (g/l) 0.02 | (g/l) 0.21 | (mg/l) 23 | (mV) 137 |
| Leaching Ratio | (%) 45 | (%) 0 | (%) 95 | (%) 2 | (%) 92 | (%) 8 | (%) 70 | — | — |

(Note)
In the table, g/L and mg/L have the same meaning as g/L and mg/L in the document body.

Second Embodiment

According to the research of the present inventors, the above oxidation method using hydrogen peroxide ($H_2O_2$) achieves approximately 100% oxidation of trivalent arsenic by accelerating the trivalent arsenic oxidation speed and causing the reaction at a high solution temperature. However, hydrogen peroxide is an expensive agent.

On the other hand, the oxidation method using ozone ($O_3$) achieves approximately 100% oxidation of trivalent arsenic in a short period of time, irrespective of solution temperature. However, this oxidation method has the following problems.

Ozone generating equipment itself requires high costs. Furthermore, ozone has strong oxidizing power, so that the specification of peripheral apparatuses needs to be upgraded. This results in extremely high costs for the system as a whole.

Because ozone is hazardous to humans, an ancillary facility for collecting and detoxifying ozone that is released to the atmosphere without reaction is necessary.

Ozone is easy to dissolve in water than oxygen gas, and the solution after reaction has a peculiar pungent odor. To resolve this problem, a process of removing dissolved ozone in a subsequent step is necessary.

Meanwhile, it became clear that the method of adding powdery metallic copper or the like as a catalyst has the following problems.

1) In the case where the solution to be treated has a low arsenic concentration (for example, approximately 3 g/L), the oxidation rate of arsenic is approximately 1000. However, in the case where the solution to be treated has a high arsenic concentration (for example, 60 to 70 g/L), the oxidation rate of arsenic drops to approximately 79%.

2) When metallic copper) ($Cu^0$) changes to copper ions ($Cu^{2+}$), the change of trivalent arsenic to pentavalent arsenic is affected. In addition, at the time of this change, at least the number of moles of metallic copper equivalent to trivalent arsenic is required. Furthermore, the same effects as metallic copper are confirmed even in a poor water soluble copper compound ($Cu_2O$, CuS). As a result, a large amount of agent (copper source) is necessary when processing arsenous acid being a trivalent arsenic compound.

3) As explained in the above 2), this method uses a large amount of copper source when processing arsenous acid (trivalent arsenic). As a result, copper ions as many as several tens of g/L remains in the solution after the reaction. Therefore, a process of recovering copper from the solution after the reaction is necessary, which causes an increase in copper recovery costs.

4) This reaction is conducted in the acidic solution (for example, the pH is 0 and the FA (free acid) value is 130 g/L), so that a large amount of acid content remains in the solution after the reaction. In order to produce a pentavalent arsenic compound based on the solution after the reaction, a large amount of alkali is necessary. This is an inevitable problem as this method requires dissolving powdery metallic copper and/or a poor water-soluble copper compound, that is, acid content is essential for this method.

Hereinafter, with regard to a second embodiment for implementing the present invention, the 1. Processing object; 2. Oxidation reaction of trivalent arsenic; 3. pH of trivalent arsenic at the beginning of the oxidation reaction; 4. pH of trivalent arsenic at the stop of the oxidation reaction; and Examples 5 to 9 and Comparative Examples 4 to 8 will be described in order in detail while referring to the flowchart shown in FIG. 3, and further the 5. Trivalent arsenic oxidation reaction model conceived by the present inventors will be described.

According to this embodiment, by using materials that can be easily obtained in non-ferrous smelters, trivalent arsenic can be oxidized to pentavalent arsenic at an oxidation rate of 99% or more with low operation costs and low equipment costs.

1. Processing Object

This embodiment is an optimum processing method for producing a highly concentrated arsenic solution.

In other words, according to this embodiment, trivalent arsenic of low solubility can be easily oxidized to pentavalent arsenic of high solubility. Therefore, by using diarsenic trioxide <1> which is solid as the trivalent arsenic source, the diarsenic trioxide dissolves simultaneously with the oxidation of trivalent arsenic to pentavalent arsenic, which ensures the timely supply of trivalent arsenic. As a result, a pentavalent arsenic solution of a concentration as high as several tens of g/L, that is, a concentrated arsenic acid solution can be easily produced.

2. Oxidation Reaction of Trivalent Arsenic

In order to derive this embodiment relating to the oxidation step <4>, the present inventors investigated the step of oxidizing trivalent arsenic by oxygen gas, using copper as an oxidation catalyst for arsenic.

Several points that are subject to the investigation are given below.

1) Using only copper ions as an oxidation catalyst (corresponding to Comparative Examples 5 and 6 described later).

2) Using only copper sulfide as an oxidation catalyst (corresponding to Comparative Example 7 described later).

3) Using the two types of oxidation catalysts of copper sulfide and copper ions together (corresponding to Comparative Example 8 described later).

4) Using the three types of oxidation catalysts of copper sulfide, copper ions, and a copper pentavalent arsenic compound together (corresponding to Examples 5 to 9 described later).

As a result of the above investigation, the oxidation catalyst effects of copper were observed in all of 1) to 4). However, 4) was found to have dramatic improvements in the oxidation catalyst effects of copper when compared with 1) to 3), in terms of oxidation speed and oxidation rate.

Based on this discovery, it was determined that copper sulfide, copper ions, and a copper pentavalent arsenic compound (copper arsenate) are used together as oxidation catalysts.

Hereinafter, (a) copper sulfide source, (b) copper ion source, (c) copper pentavalent arsenic compound (copper arsenate), (d) reaction temperature, and (e) blowing gas type and blowing amount will be described in detail.

(a) Copper Sulfide Source

Copper sulfide solid, copper sulfide powder, and the like can be used as the copper sulfide source <2>. Furthermore, the powdery state is preferable from the perspective of ensuring reactivity. In addition, copper sulfide can be mainly classified into the two compositions of CuS and $Cu_2S$ (there is also $Cu_9S_5$ being a composition in which a portion of copper in crystal lattice is defective). In this embodiment, any of them is effective, and a mixture of them is also possible. Moreover, the copper sulfide source is preferably as pure copper sulfide as possible (copper sulfide of high purity with minimum impurities). This is because contamination with $As_2S_3$, ZnS, PbS, CdS, and the like can be avoided by using copper sulfide of high purity.

If contaminated with $As_2S_3$, ZnS, PbS, CdS, and the like occurs, the following reactions occur. As a result, the supply of copper ions necessary for the oxidation reaction of trivalent arsenic is hindered.

Furthermore, regarding $As_2S_3$, that is, arsenic sulfide, even when copper ions are added consciously, the following reaction occurs, which not only makes the maintenance of an optimum copper ion concentration difficult, but also causes hydrogen ion ($H^+$) evolution reaction. When hydrogen ions ($H^+$) are generated, the pH of the reaction system drops. This makes it difficult to maintain the oxidation reaction of trivalent arsenic according to the present invention, and makes it difficult to oxidize trivalent arsenic.

$$Cu^{2+}+1/3 As_2S_3+4/3 H_2O = CuS + 2/3 HAsO_2 + 2H^+ \quad \text{(Equation 11)}$$

$$Cu^{2+}+ZnS = CuS + Zn^{2+} \quad \text{(Equation 12)}$$

$$Cu^{2+}+PbS = CuS + Pb^{2+} \quad \text{(Equation 13)}$$

$$Cu^{2+}+CdS = CuS + Cd^{2+} \quad \text{(Equation 14)}$$

Consider the case where copper sulfide recovered as smelting intermediates is used as the copper sulfide source <2>. The recovered copper sulfide contains substantial amounts of the aforementioned $As_2S_3$, ZnS, PbS, CdS, and the like. Therefore, it is not preferable to use the copper sulfide recovered as smelting intermediates directly as the copper sulfide source <2>. However, the recovered copper sulfide can be used if the aforementioned sulfides are removed beforehand by decomposition reaction or the like to thereby increase the purity as copper sulfide.

In copper smelters, copper sulfide of high purity suitable for the present invention can be easily produced according to the following method.

(1) Electrolytic copper is dissolved (Cu=10 to 30 g/L) by aeration while heating under sulfite acidic conditions (FA (free acid)=50 to 300 g/L), to obtain a copper solution.

(2) The obtained copper solution is reacted with a sulfidizing agent such as NaSH or $H_2S$ at a temperature of 50° C. or more, to recover copper sulfide.

(3) The recovered copper sulfide is washed with water to remove adhered acid content.

The copper sulfide after the water cleaning has little impurities, and is suitable for the present invention in any of the dry condition and the wet condition.

(b) Copper Ion Source

A substance that becomes copper ions in the solution to be treated can be used as the copper ion source <3>. For example, copper sulfide is preferable, as it is solid at ordinary temperatures, but dissolves into water and immediately becomes copper ions. Though metallic copper or metallic copper powder can also be used, it is necessary to wait for the dissolution until they are ionized.

(c) Copper Pentavalent Arsenic Compound (Copper Arsenate)

Copper arsenate is available as the copper pentavalent arsenic compound according to the present invention. Copper arsenate has a solubility product comparable to iron arsenate ($FeAsO_4$), and is a pentavalent arsenic compound that is easily formed in the weakly acidic to neutral region.

In this embodiment, copper sulfide is added to the solution containing trivalent arsenic with the initial pH value being set to 2 or more, and the oxidation reaction is started. Thus, the oxidation of the trivalent arsenic to pentavalent arsenic and the supply of copper ions by the dissolution of the copper sulfide occur simultaneously on the surface of the added copper sulfide, and therefore the generation of copper arsenate is though to occur instantaneously. When the reaction is complete, the solution is naturally transferred to the weakly acidic region. By this time, however, the pentavalent arsenic and the copper ions are both concentrated to the order of g/L. Due to this concentration, the generative capacity of the copper arsenate will not decrease.

At this point, unless the pH of the solution sinks below 1 into the acidic state, the forming capacity of the copper arsenate will not decrease significantly. Accordingly, it is preferable to control the pH.

(d) Reaction Temperature

The oxidation of arsenic is preferably performed at a higher solution temperature. Specifically, a temperature of 50° C. or more is required for the progress of the oxidation of arsenic. The solution is heated <5> to 70 to 90° C. and preferably about 80° C., in consideration of real operation and based on the premise such as the material of the reaction tank and the filtering operation after the reaction.

(e) Blowing Gas Type and Blowing Amount

The oxidation reaction of trivalent arsenic is possible even when the blowing gas <6> is air. However, when oxygen gas or a gas mixture of air and oxygen gas is used as the blowing gas <6>, the oxidation speed is maintained even in the range where the arsenic concentration in the solution is low, and the blowing (gas) capacity decreases. As a result, heat loss associated with this is reduced, and the maintenance of the reaction temperature becomes easier. Therefore, it is preferable to use oxygen gas or a gas mixture of oxygen gas and air as the blowing gas <6>, in terms of the oxidation speed and the reaction temperature maintenance.

Regarding the blowing amount per unit time of the blowing gas <6>, its optimum value changes depending on the gas-liquid mixing state in the reaction tank. For example, by using a microscopic bubble generation apparatus and the like, the oxidation efficiency can be further improved, and the blowing amount can be reduced.

Therefore, at the time of real operation, it is important to find the optimum value in consideration of the gas-liquid mixing state, the oxygen gas blowing method, and the like.

3. pH of Trivalent Arsenic at the Beginning of the Oxidation Reaction

A basic equation of the oxidation reaction of trivalent arsenic according to the present invention is thought to be the following.

$As_2O_3 + H_2O = 2HAsO_2$ (Equation 15): Reaction in which diarsenic trioxide dissolves in water as arsenous acid (trivalent arsenic).

$2HAsO_2 + O_2 + 2H_2O = 2H_2AsO_4^- + 2H^+$ (Equation 16): Reaction in which arsenous acid (trivalent arsenic) oxides.

$2HAsO_2 + O_2 + 2H_2O = 2H_3AsO_4$ (Equation 17): Reaction in which arsenous acid (trivalent arsenic) oxides.

As in the Examples described later, in the case of the concentrated solution whose arsenous acid concentration at the time of complete arsenic dissolution is 40 g/L or more, the solubility of arsenous acid is small, and therefore diarsenic trioxide does not dissolve totally in the initial stage.

In the case of the concentrated arsenic solution, simultaneously with the oxidation of arsenous acid to arsenate of high solubility according to (Equation 16) and (Equation 17) and the decrease of the arsenous acid concentration, the reaction (Equation 15) in which arsenous acid is added into the system is thought to proceed. In other words, the solid diarsenic trioxide is thought to dissolve while being suspended in the initial stage of the reaction.

At this point, the oxidation of arsenous acid to arsenate is thought to be in accordance with (Equation 16) and (Equation 17).

In the oxidation reaction of arsenous acid to arsenate, the behavior in which the pH of the solution rapidly decreases to about 2 is shown in initial 30 minutes. From this behavior, it can be estimated that the oxidation mainly proceeds according to (Equation 16) in the neutral region where the pH is 2 or more. Meanwhile, the decrease of the pH becomes gradual in the subsequent 30 minutes, and so it can be estimated that the reaction mainly proceeds according to (Equation 17).

In view of the above, it can be understood that the efficient oxidation of trivalent arsenic and the control of the pH at the stop of the reaction to the weakly acidic state according to the present invention can be achieved by setting the pH at the beginning of the oxidation reaction (when the air and/or oxygen gas blowing starts) to 2 or more.

4. pH of Trivalent Arsenate at the Stop of the Oxidation Reaction

In this embodiment according to the present invention, the pH of trivalent arsenate at the stop of the oxidation reaction (when the air and/or oxygen gas blowing stops) was below 2 and more specifically about 1.8 in all cases, as shown by the results of Examples 5 to 9 described later.

This pH of about 1.8 is a preferable pH for producing a pentavalent arsenic compound (the acid concentration is at an adequate level). This is because the optimum pH range for producing iron arsenate which is a pentavalent arsenic compound is pH=3.5 to 4.5, and so the neutralizing agent consumed for neutralizing acid content can be reduced.

On the other hand, in the production of scorodite ($FeAsO_4 \cdot 2H_2O$), the pentavalent arsenic solution whose pH is about 1 is used as the stock solution, and therefore the pH can be adjusted by adding a small amount of inverse neutralizing agent (for example, sulfuric acid). Furthermore, the pH at the stop of the reaction is preferably not less than 1 and below 2, though the details will be described in Example 9 below.

The pH at the stop of the trivalent arsenic oxidation reaction (when the air and/or oxygen blowing stops) being below 2 and specifically about 1.8 is thought to be derived from the above (Equation 15) to (Equation 17).

First, according to (Equation 15), diarsenic trioxide is dissolved in water as arsenous acid (trivalent arsenic). Furthermore, this is not limited to the case where the starting row material is the solid diarsenic trioxide, but also applies to the case of the aqueous solution in which arsenic trioxide has already been dissolved as arsenous acid (therefore, the present invention is thought to be applicable to ordinary drainage treatment).

The product obtained in the above oxidation step <4> is separated in the filtering <7> into the filtrate <8> and the filtrand <9>. In the filtering <7>, an ordinary filtering method such as filter press can be applied. This is because, though a copper pentavalent arsenic compound is generated in the above oxidation step <4>, there is no problem of filterability such as increased viscosity.

The obtained filtrate <7> is an arsenate solution having a pH of about 1.8 as mentioned above. Since the pH of about 1.8 is preferable for producing pentavalent arsenic compounds, a pentavalen arsenic compound can be produced from the filtrate <7> with low costs and high productivity.

On the other hand, the filtrand <9> is a mixture of copper sulfide and a copper pendavalent arsenic compound, and accordingly can be repeatedly used as it is as an oxidation catalyst. When repeatedly using this, the catalyst effect can be expected to increase by newly adding copper sulfide of an amount equivalent to partially dissolved copper sulfide.

5. Trivalent Arsenic Oxidation Reaction Mechanism Model

The ternary catalyst made up of copper sulfide, copper ions, and a copper pentavalent arsenic compound according to the present invention has both a high oxidation rate and a high oxidation speed. The oxidation catalyst effects exhibited by this ternary catalyst is thought to be derived from the battery-like reaction caused by the contact of each type of ionson the copper sulfide surface.

For example, consider the model of the oxidation reaction mechanism using the region of about pH=2 as an Example.

First, substituting the trivalent arsenic oxidation to electrode reactions yields (Equation 18) showing the anodic reaction and (Equation 19) showing the cathodic reaction.

$As_2O_3 + 5H_2O = 2H_3OAsO_4 + 4H^+ + 4e^-$ (Equation 18)

$4H^+ + O_2 + 4e^- = 2H_2O$ (Equation 19)

In other words, the oxidation reaction of trivalent arsenic proceeds as shown in (Equation 18), but it is necessary to maintain electrical neutralization in order to have the reaction proceed. Therefore, the reactivity depends on the progress of the cathodic reaction shown in (Equation 19) which proceeds on the copper sulfide surface. Due to this, it is thought to be important to secure the copper sulfide surface which always has a high activation level.

Which is to say, in the present reaction model system, copper ions coexist and also the reaction occurs in the weakly acidic pH region, and therefore the crystallizing reaction of the copper sulfide compound as shown in (Equation 20) is thought to occur on the copper sulfide surface.

$Cu^{2+} + H_3AsO_4 + H_2O = CuHAsO_4 \cdot H_2O + 2H^+$ (Equation 20)

According to (Equation 20), it can be considered that hydrogen ions ($H^+$) are added to the copper sulfide surface and the reactions shown in (Equation 21) and (Equation 22) proceed simultaneously.

$CuS + 2H^+ + \frac{1}{2}O_2 = Cu^{2+} + S^\circ + H_2O$ (Equation 21)

$CuS + H^+ + 2O_2 = Cu^{2+} + HSO_4^-$ (Equation 22)

At this time, the copper arsenate compound is formed on the copper sulfide surface, so that the oxygen gas supply becomes insufficient and the $S^\circ$ (monatomic sulfur) generating reaction as shown in (Equation 21) is likely to proceed. Further, with the progress of (Equation 21) and (Equation 22), it is estimated that the Cu ion concentration increases locally and also the hydrogen ion ($H^+$) concentration decreases. At this location, the copper sulfide generating reaction shown in (Equation 23) is thought to proceed simultaneously with the above (Equation 21) and (Equation 22).

$Cu^{2+} + 4/3 S^\circ + 4/3 H_2O = CuS + \frac{1}{3}HSO_4^- + 7/3 H^+$ (Equation 23)

(Equation 23) shows the crystallization of CuS which is copper sulfide, and indicates that the CuS crystallization is ensured on the copper sulfide surface as the newly-formed surface of high activity.

Furthermore, the hydrogen ions ($H^+$) generated in (Equation 23) are supplied to the reactions shown in (Equation 21) and (Equation 22), and also consumed in the dissolution reaction of the copper arsenate compound (the inverse reaction of (Equation 20)). As a result, the addition of copper ions to the copper sulfide surface and the dispersion of arsenic acid ($H_3AsO_4$) to the periphery are thought to proceed.

Note, in the condition of pH=0 shown in Comparative Example 8 below, basically the reaction shown in (Equation 20) does not proceed and the reaction shown in (Equation 23) does not proceed easily, and so it is interpreted that the oxidation efficiency drops significantly.

Examples

Example 5

Diarsenic trioxide of reagent grade (the grade is shown in Table 15) and copper sulfide of reagent grade (the grade is shown in Table 16) were prepared.

As described above, copper sulfide can be mainly classified into the two forms of CuS and $Cu_2S$, and there is also a composition $Cu_9S_5$ in which a portion of copper in crystal lattice is defective. Any of these forms is usable, and a mixture of these forms is applicable too.

The results of X-ray diffraction of copper sulfide used in this Example are shown in FIG. 4. Note, in FIG. 4, the peak of CuS is plotted as Δ, the peak of $Cu_2S$ is plotted as *, and the peak of $Cu_9S_5$ is plotted as ♦. From the results of X-ray diffraction, the copper sulfide used in this Example is thought to be the mixture of CuS, $Cu_2S$, and $Cu_9S_5$.

TABLE 15

| arsenic (%) | sulfur (ppm) | copper (ppm) | zinc (ppm) | lead (ppm) | cadmium (ppm) |
|---|---|---|---|---|---|
| 74.8 | 1,303 | 27 | 11 | 60 | 2 |

TABLE 16

| copper (%) | sulfur (%) | zinc (ppm) | lead (ppm) | cadmium (ppm) |
|---|---|---|---|---|
| 71.2 | 26.1 | 29 | 2 | 1 |

A 1 L beaker was used as the reaction vessel, a 2-stage turbine blade and 4 baffle plates of 700 rpm were used as the mixture device, and the gas blowing was conducted by blowing in oxygen gas using a glass tube from the bottom of the beaker (the oxidation was performed in a gas and liquid mixture in vigorous mixing).

50 g of diarsenic trioxide and 48 g of copper sulfide were introduced in the reaction vessel, 800 cc of pure water was added to repulp, and the solution was heated to 80° C. Next, the mixture of the solution was started using the mixture device, and further the blowing of oxygen gas from the bottom of the reaction vessel was started at 400 cc/min, to oxidize trivalent arsenic. Note, the pH of the solution immediately before the oxygen gas blowing start was 3.09 (at 80° C.).

The solution mixture and the oxygen gas blowing were continued for 90 minutes to oxidize the trivalent arsenic. The temperature, pH, redox potential, copper ion amount, trivalent arsenic amount, and pentavalent arsenic amount of the solution were measured every 30 minutes. The measurement results are shown in Table 17. Note, the redox potential is Ag/AgCl reference electrode value.

TABLE 17

| | Elapsed time (minutes) | | |
|---|---|---|---|
| | 30 | 60 | 90 |
| Temperature (° C.) | 79 | 79 | 79 |
| pH | 2.13 | 1.88 | 1.84 |
| Redox potential (mV) | 298 | 327 | 383 |
| $Cu^{2+}$ (g/L) | 1.8 | 4.0 | 5.6 |
| Trivalent arsenic (g/L) | 29.2 | 8.3 | 0.2 |
| Pentavalent arsenic (g/L) | 13.9 | 33.2 | 40.7 |
| Oxidation rate (%) | 32.3 | 80.0 | 99.5 |

After the oxidation of the trivalent arsenic was continued for 90 minutes, the solution was filtered, the catalyst recovered as the residue was washed with water, and the grade analysis and X-ray diffraction of the catalyst were performed. The grade analysis results and X-ray diffraction results of the catalyst after the reaction are shown in Table 18 and FIG. 5, respectively. In FIG. 5, the peak of Cu is plotted by Δ, and the peak of the copper pentavalent arsenic compound is plotted by ○.

TABLE 18

| copper (%) | sulfur (%) | arsenic (%) |
|---|---|---|
| 54.2 | 22.6 | 10.5 |

From Table 17, Table 18, and FIG. 5, it can be understood that copper sulfide, copper ions, and a copper pentavalent arsenic compound (copper arsenate) coexist in the reaction system according to Example 5.

Moreover, it can be understood that the oxidation speed and the oxidation rate of the trivalent arsenic are high in Example 5. In particular, it was confirmed that the oxidation rate of 99% or more was already reached at the point of 90 minutes after the oxidation reaction start.

Example 6

The same operations and measurements as in Example 5 were performed except that the amount of copper sulfide introduced in the reaction vessel was 24 g which is one half.

Note, the pH of the solution immediately before the oxygen gas blowing start was 2.96 (at 80° C.).

The results of measuring the temperature, pH, redox potential, copper ion amount, trivalent arsenic amount, and pentavalent arsenic amount of the solution every 30 minutes are shown in Table 19, and the analysis results of the grade of the catalyst recovered as the residue and washed with water are shown in Table 20.

TABLE 19

| | Elapsed time (minutes) | | | |
|---|---|---|---|---|
| | 30 | 60 | 90 | 120 |
| Temperature (° C.) | 79 | 80 | 80 | 80 |
| pH | 2.17 | 1.88 | 1.80 | 1.79 |
| Redox potential (mV) | 301 | 317 | 336 | 384 |
| $Cu^{2+}$ (g/L) | 1.1 | 2.1 | 3.1 | 4.5 |
| Trivalent arsenic (g/L) | 32.6 | 21.3 | 7.4 | 0.3 |
| Pentavalent arsenic (g/L) | 11.4 | 24.1 | 38.0 | 45.6 |
| Oxidation rate (%) | 25.9 | 53.1 | 83.7 | 99.4 |

TABLE 20

| copper (%) | sulfur (%) | arsenic (%) |
|---|---|---|
| 63.4 | 29.4 | 2.3 |

In Example 6, the CuS additive amount is reduced by half of Example 5, to examine the effects of this reduction by half. As a result, the oxidation speed of trivalent arsenic decreased a little when compared with Example 6, but the oxidation capacity was sufficiently maintained, and the oxidation of 99% or more was observed at the point of 120 minutes after the oxidation reaction start. As with Example 5, the oxidation capacity and speed of trivalent arsenic can both be considered favorable for practical use.

Example 7

This Example is similar to Example 5, but further 16 g of copper sulfide of reagent grade ($CuSO_4.5H_2O$) was introduced into the reaction vessel. The amount of copper sulfide introduced is equivalent to 5 g/L as copper ions. This Example relates to the case of increasing the copper ion concentration than in the initial stage of the reaction.

Note, the pH of the solution immediately before the oxygen gas blowing start was 2.98 (at 80° C.).

The results of measuring the temperature, pH, redox potential, copper ion amount, trivalent arsenic amount, and pentavalent arsenic amount of the solution every 30 minutes are shown in Table 21.

In this Example, the oxygen gas blowing was stopped at 120 minutes when the reaction ended. After this, a NaOH solution of concentration 500 g/L was added to neutralize the solution to pH=3.5, copper ions existing in the solution were crystallized as a pentavalent arsenic compound, and then the filtering operation was performed. Note, the additive amount of the NaOH solution was 40 cc.

The total arsenic concentration in the filtrate obtained as a result of the filtering operation was 29.6 g/L, while the copper concentration was 80 mg/L. Thus, the concentration decrease associated with the formation of the copper arsenate compound was observed.

On the other hand, the residue recovered as a result of the filtering operation was 165 g·wet. Extracting 5 g·wet of this residue and measuring the moisture content produced the results that the moisture content=59.9%. In addition, 5 g·wet of the residue was washed with water and the grade was analyzed. The analysis results of the grade of the recovered residue are shown in Table 22.

TABLE 21

| | Elapsed time (minutes) | | | |
|---|---|---|---|---|
| | 30 | 60 | 90 | 120 |
| Temperature (° C.) | 79 | 79 | 80 | 80 |
| pH | 1.84 | 1.86 | 1.90 | 1.79 |
| Redox potential (mV) | 299 | 321 | 356 | 386 |
| $Cu^{2+}$ (g/L) | 6.1 | 8.0 | 10.1 | 10.9 |
| Trivalent arsenic (g/L) | 34.7 | 17.0 | 0.7 | 0.2 |
| Pentavalent arsenic (g/L) | 7.9 | 27.9 | 42.8 | 41.0 |
| Oxidation rate (%) | 18.5 | 62.2 | 98.5 | 99.5 |

TABLE 22

| copper (%) | sulfur (%) | arsenic (%) |
|---|---|---|
| 47.5 | 12.1 | 19.7 |

Example 7 increases the Cu ion concentration than in the initial stage of the reaction in Example 5. From the results of Table 21, it can be understood that the reaction was complete at a high oxidation rate in Example 7, too.

On the other hand, in Example 7, the oxidation speed decreased a little when compared with Example 5. This indicates that the copper ion concentration in the reaction system need not increased more than necessary. It can be judged that the sufficient copper ion concentration in the reaction system is approximately 1 to 5 g/L.

Furthermore, when using copper sulfide immediately after being produced by the wet sulfidation reaction, this copper sulfide has a behavior of poor solubility. In view of this, when using copper sulfide immediately after being produced by the wet sulfidation reaction, the addition of copper ions to the reaction system is effective.

Moreover, Example 7 recovers added copper ions as a copper pentavalent arsenic compound by neutralization. The method of recovering copper ions is not limited to the method of recovering as a copper pentavalent arsenic compound, and may instead be a method of adding an agent that reacts with copper ions and forms copper sulfide, such as monatomic sulfur or ZnS.

Example 8

50 g of diarsenic trioxide of reagent grade was prepared.
The whole residue recovered in Example 7 (except 10 g·wet used for the measurement sample in Example 7) and 50 g of diarsenic trioxide were introduced into the reaction vessel, and 707 cc of pure water was added to repulp, to bring the moisture content in the pulp to be 800 cc. This pulp was heated to 80° C., and then oxygen gas was started to be blown in from the bottom of the reaction vessel at 400 cc/min.

Note, the pH of the solution immediately before the oxygen gas blowing start was 3.03 (at 79° C.).

The results of measuring the temperature, pH, redox potential, copper ion amount, trivalent arsenic amount, and pentavalent arsenic amount of the solution every 30 minutes are shown in Table 23.

TABLE 23

| | Elapsed time (minutes) | | |
|---|---|---|---|
| | 30 | 60 | 90 |
| Temperature (° C.) | 80 | 80 | 79 |
| pH | 2.20 | 1.90 | 1.83 |
| Redox potential (mV) | 294 | 349 | 382 |
| $Cu^{2+}$ (g/L) | 2.2 | 3.2 | 4.7 |
| Trivalent arsenic (g/L) | 24.2 | 2.4 | 0.2 |
| Pentavalent arsenic (g/L) | 24.4 | 48.5 | 52.3 |
| Oxidation rate (%) | 50.2 | 95.3 | 99.6 |

After the reaction for 90 minutes, the oxygen gas blowing was stopped, a NaOH solution of concentration 500 g/L was added to neutralize the solution to pH=3.0, and then the solution was filtered. Note, the amount of the NaOH solution used was 36 cc.

The total arsenic concentration in the filtrate obtained was 44.8 g/L, while the Cu concentration was 210 mg/L. Thus, the recovery of the arsenic concentration approximately equivalent to the composition concentration was observed.

On the other hand, the residue recovered was 122 g·wet. Extracting 5 g·wet of this residue and measuring the moisture content produced the results that the moisture content=48.9%. In addition, 5 g·wet of the residue was washed with water and the grade was analyzed. The analysis results of the grade of the catalyst recovered as the residue are shown in Table 24.

TABLE 24

| copper (%) | sulfur (%) | arsenic (%) |
|---|---|---|
| 44.4 | 10.6 | 21.8 |

Example 8 exhibited highest oxidation efficiency and a highest oxidation speed, in Examples 5 to 9. Specifically, the oxidation of 95% was already observed at the point of 60 minutes from the reaction, and the oxidation rate of 99.6% which is approximately 100% was observed at the point of 90 minutes from the reaction.

The catalyst according to Example 8 is the ternate catalyst of copper sulfide, copper ions, and a copper arsenate compound (copper pentavalent arsenic compound), too. The catalyst according to Example 8 especially has a high content ratio of the copper arsenate compound (copper pentavalent arsenic compound), compared to Examples 5 and 6. This high content ratio of the copper arsenate compound is thought to contribute to the improved oxidation performance. In other words, as described in "Model of oxidation reaction" this contribution phenomenon demonstrates that the formation and presence of the copper arsenate compound relates to the generation of the newly-formed surface of CuS of high activity.

Example 9

The same operations as in Example 6 were performed except that the pH immediately before the oxygen gas blowing start was adjusted to 1.0 (at 80° C.) by adding concentrated sulfuric acid to the pulp.

The results of measuring the temperature, pH, redox potential, copper ion amount, trivalent arsenic amount, and pentavalent arsenic amount of the solution every 30 minutes are shown in Table 25. Moreover, the catalyst grade after the reaction (washed with water) are shown in Table 26.

TABLE 25

| | Elapsed time (minutes) | | | |
|---|---|---|---|---|
| | 30 | 60 | 90 | 120 |
| Temperature (° C.) | 81 | 79 | 80 | 79 |
| pH | 1.22 | 1.15 | 1.15 | 1.13 |
| Redox potential (mV) | 363 | 371 | 375 | 380 |
| $Cu^{2+}$ (g/L) | 4.8 | 5.2 | 5.7 | 6.3 |
| Trivalent arsenic (g/L) | 33.6 | 24.4 | 17.6 | 12.8 |
| Pentavalent arsenic (g/L) | 10.9 | 21.2 | 28.2 | 33.4 |
| Oxidation rate (%) | 24.5 | 46.5 | 61.6 | 72.3 |

TABLE 26

| copper (%) | sulfur (%) | arsenic (%) |
|---|---|---|
| 66.0 | 31.1 | 0.6 |

Example 9 is similar to Example 6 in the amount of copper sulfide added, but the pH of the solution immediately before the oxidation start was adjusted to 1.

As a result, the oxidation capacity decreased when compared with Example 6, and the oxidation rate was 72% at the point of 120 minutes. Though the reaction needs to be performed for a long period of time to reach the oxidation rate of 100%, the oxidation capacity itself is sufficient.

The reason of the above oxidation speed decrease can be attributed to the fact that the coexisting copper sulfide was significantly reduced. Furthermore, when the pH of the solution is 1, the amount of dissolution of copper sulfide increases, so that the amount of copper sulfide recovered without dissolving (amount of recycle) decreases, which is disadvantageous in terms of cost, too.

In view of the above, it is thought to be preferable to start the reaction by setting the pH of the solution to not less than 2 and ending the oxidation reaction with a pH of not less than 1, in terms of ensuring the reactivity and the CuS recovery amount.

Comparative Example 4

The same operation as in Example 5 was performed except that 50 g of diarsenic trioxide of reagent grade alone was introduced in the reaction vessel and 800 cc of pure water was added to repulp.

Note, the pH of the solution immediately before the oxygen gas blowing start was 2.80 (at 80° C.).

The temperature, pH, redox potential, copper ion amount, trivalent arsenic amount, and pentavalent arsenic amount of the solution were measured every 30 minutes. The measurement results are shown in Table 27.

TABLE 27

| | Elapsed time (minutes) | | |
|---|---|---|---|
| | 30 | 60 | 90 |
| Temperature (° C.) | 80 | 79 | 80 |
| pH | 2.71 | 2.68 | 2.67 |
| Redox potential (mV) | 378 | 373 | 370 |
| $Cu^{2+}$ (g/L) | <0.1 | <0.1 | <0.1 |
| Trivalent arsenic (g/L) | 42.0 | 44.0 | 45.5 |
| Pentavalent arsenic (g/L) | 0 | 0.1 | 0.4 |
| Oxidation rate (%) | 0 | 0.2 | 0.9 |

In Comparative Example 4, it was observed that the oxidation of trivalent arsenic proceeded little.

Comparative Example 5

The same operation as in Example 5 was performed except that 50 g of diarsenic trioxide of reagent grade and 16 g of copper sulfide of reagent grade ($CuSO_4.5H_2O$) were introduced in the reaction vessel and 800 cc of pure water was added to repulp.

Note, the pH of the solution immediately before the oxygen gas blowing start was 3.33 (at 80° C.).

The temperature, pH, redox potential, copper ion amount, trivalent arsenic amount, and pentavalent arsenic amount of the solution were measured every 30 minutes. The measurement results are shown in Table 28.

TABLE 28

| | Elapsed time (minutes) | | |
|---|---|---|---|
| | 30 | 60 | 90 |
| Temperature (° C.) | 81 | 79 | 80 |
| pH | 3.22 | 3.16 | 3.10 |
| Redox potential (mV) | 373 | 378 | 382 |
| $Cu^{2+}$ (g/L) | 5.3 | 5.5 | 5.7 |
| Trivalent arsenic (g/L) | 40.3 | 43.6 | 45.3 |
| Pentavalent arsenic (g/L) | 0.5 | 0.9 | 1.3 |
| Oxidation rate (%) | 1.2 | 2.0 | 2.8 |

In Comparative Example 5, though the progress of oxidation was observed when compared with Comparative Example 4, but the degree of progress was still small.

Comparative Example 6

The same operation as in Example 5 was performed except that 50 g of diarsenic trioxide of reagent grade and 32 g of copper sulfide of reagent grade ($CuSO_4.5H_2O$) (10 g/L as copper ions) were introduced in the reaction vessel and 800 cc of pure water was added to repulp.

Note, the pH of the solution immediately before the oxygen gas blowing start was 3.45 (at 80° C.).

The temperature, pH, redox potential, copper ion amount, trivalent arsenic amount, and pentavalent arsenic amount of the solution were measured every 30 minutes. The measurement results are shown in Table 29.

TABLE 29

| | Elapsed time (minutes) | | |
|---|---|---|---|
| | 30 | 60 | 90 |
| Temperature (° C.) | 79 | 81 | 79 |
| pH | 3.29 | 3.20 | 3.25 |
| Redox potential (mV) | 369 | 372 | 378 |
| $Cu^{2+}$ (g/L) | 10.7 | 10.6 | 10.8 |
| Trivalent arsenic (g/L) | 39.5 | 42.5 | 43.4 |

TABLE 29-continued

|  | Elapsed time (minutes) | | |
| --- | --- | --- | --- |
|  | 30 | 60 | 90 |
| Pentavalent arsenic (g/L) | 2.5 | 3.0 | 3.5 |
| Oxidation rate (%) | 6.0 | 6.6 | 7.4 |

In Comparative Example 6, the progress of oxidation was observed as a result of increasing the Cu ion concentration in the solution. However, the degree of progress of oxidation was still small, and further addition of copper ions is thought to be necessary. Hence Comparative Example 6 is not suitable for practical use.

Comparative Example 7

The same operation as in Example 5 was performed except that 50 g of diarsenic trioxide of reagent grade, 48 g of copper sulfide of reagent grade (CuS), and 20 g of sulfur powder were introduced in the reaction vessel and 800 cc of pure water was added to repulp.

Note, the pH of the solution immediately before the oxygen gas blowing start was 2.67 (at 80° C.).

The temperature, pH, redox potential, copper ion amount, trivalent arsenic amount, and pentavalent arsenic amount of the solution were measured every 30 minutes. The measurement results are shown in Table 30.

TABLE 30

|  | Elapsed time (minutes) | | |
| --- | --- | --- | --- |
|  | 30 | 60 | 90 |
| Temperature (° C.) | 79 | 79 | 81 |
| pH | 1.75 | 1.65 | 1.63 |
| Redox potential (mV) | 340 | 341 | 343 |
| $Cu^{2+}$ (g/L) | <0.1 | <0.1 | <0.1 |
| Trivalent arsenic (g/L) | 35.2 | 35.3 | 35.4 |
| Pentavalent arsenic (g/L) | 10.4 | 10.7 | 10.9 |
| Oxidation rate (%) | 22.8 | 23.3 | 23.5 |

After the end of the reaction, the solution was filtered, the obtained residue was washed with water, and the grade analysis and X-ray diffraction were performed. The catalyst grade after the reaction (washed with water) is shown in Table 31, and the X-ray diffraction results are shown in FIG. 6.

In FIG. 6, the peak of CuS is plotted by Δ, and the peak of sulfur is plotted by ■.

In the grade analysis, 0.1% arsenic was detected, but this can be considered to result from the uncleaned solution adhesion.

From FIG. 6 and Table 31, it can be understood that there is no presence of copper ions and a copper pentavalent arsenic compound in Comparative Example 7 to a single catalyst system of copper sulfide.

TABLE 31

| copper (%) | sulfur (%) | arsenic (%) |
| --- | --- | --- |
| 49.5 | 50.0 | 0.1 |

In Comparative Example 7, the progress of oxidation was observed. This indicates that single copper sulfide has a higher oxidation capacity as a catalyst than single Cu ions used in Comparative Examples 5 and 6. However, the degree of progress of oxidation is still not appropriate in terms of practical use.

Comparative Example 8

The same operation as in Example 5 was performed except that concentrated sulfuric acid was added to pulp, the pH was adjusted to 0 (at 80° C.), and then the oxygen gas blowing was started.

The temperature, pH, redox potential, copper ion amount, trivalent arsenic amount, and pentavalent arsenic amount of the solution were measured every 30 minutes. The measurement results are shown in Table 32.

TABLE 32

|  | Elapsed time (minutes) | | | |
| --- | --- | --- | --- | --- |
|  | 30 | 60 | 90 | 120 |
| Temperature (° C.) | 80 | 79 | 80 | 80 |
| pH | 0.00 | 0.00 | −0.02 | −0.04 |
| Redox potential (mV) | 411 | 415 | 412 | 411 |
| $Cu^{2+}$ (g/L) | 9.7 | 10.8 | 11.2 | 11.5 |
| Trivalent arsenic (g/L) | 32.7 | 31.9 | 32.6 | 31.6 |
| Pentavalent arsenic (g/L) | 1.7 | 2.8 | 3.5 | 4.8 |
| Oxidation rate (%) | 4.9 | 8.0 | 9.7 | 13.1 |

After the end of the reaction, the solution was filtered, the obtained residue was washed with water, and the grade analysis and X-ray diffraction were performed. The catalyst grade after the reaction (washed with water) is shown in Table 33, and the X-ray diffraction results are shown in FIG. 7. In FIG. 7, the peak of CuS is plotted by Δ, and the peak of diarsenic trioxide is plotted by □.

TABLE 33

| copper (%) | sulfur (%) | arsenic (%) |
| --- | --- | --- |
| 56.2 | 28.9 | 10.6 |

In Comparative Example 8, the oxidation of arsenic did not progress, and 10.6% arsenic was detected even in the catalyst after the reaction. Moreover, since diarsenic trioxide was acknowledged from the X-ray diffraction results as shown in FIG. 7, it can be understood that the diarsenic trioxide remained without dissolving even after the oxidation reaction.

This is thought to be because the solubility of diarsenic trioxide decreased since the oxidation reaction was started in the sulfuric acidified solution having a pH of 0, and also because trivalent arsenic eluted into the solution remains without being oxidized to pentavalent arsenic of high solubility and therefore the trivalent arsenic concentration in the solution did not decrease and a portion of diarsenic trioxide remains without dissolving.

The results of Comparative Example 8 indicate that, when starting the arsenic oxidation reaction under a condition where the pH is 0 which does not allow formation of copper sulfide, the substances that serve as catalysts are the binary system of copper sulfide and copper ions, which results in a significant drop of the oxidation capacity. This demonstrates that the arsenic oxidation reaction according to the present invention is preferably started under a condition where the pH is not less than 1.

Figure 1:
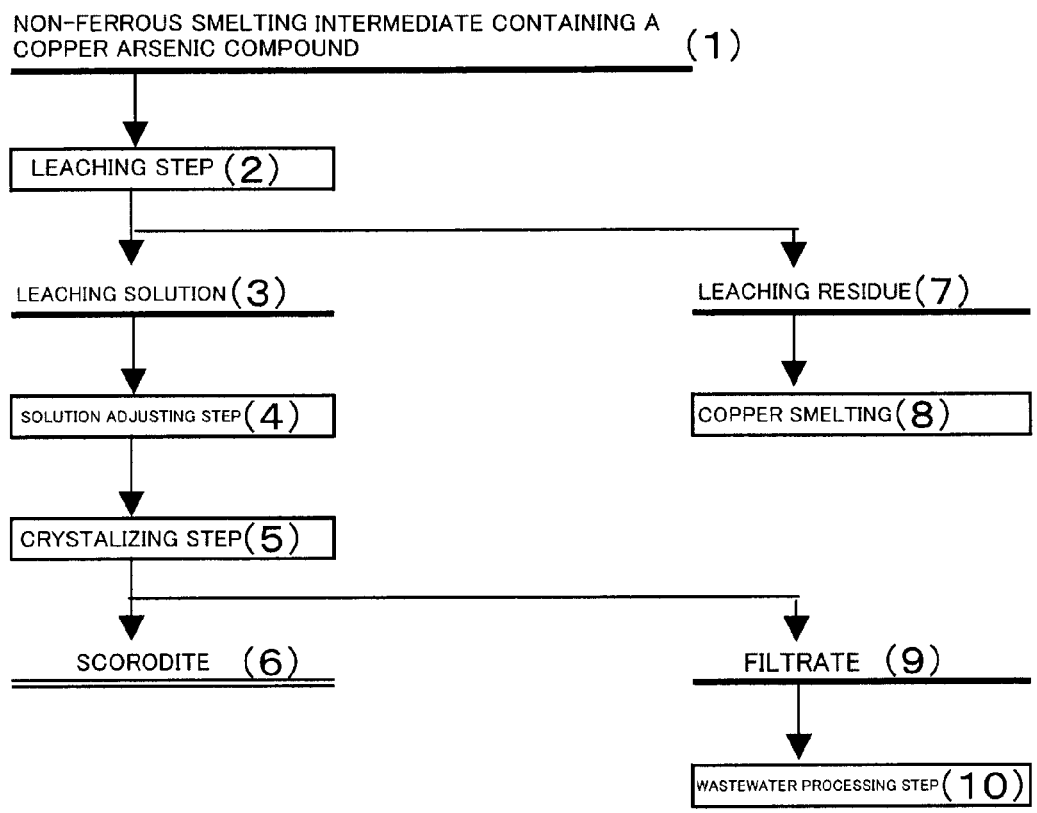
FIG. 1 is a flowchart showing the arsenic processing method of the present invention (first embodiment)
Figure 2:
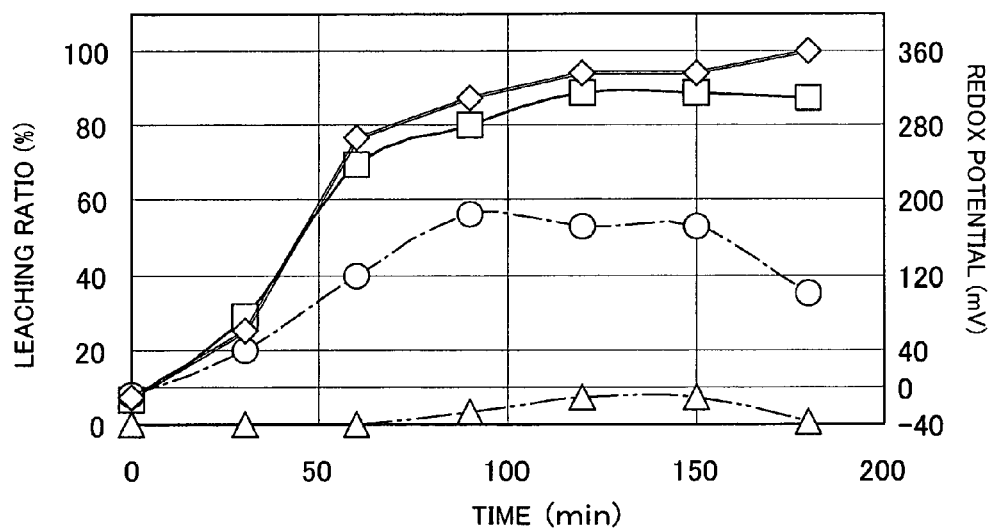
FIG. 2 is a graph showing the relationship between the leaching ratio of each element, the redox potential, and the leaching time.
Figure 3:
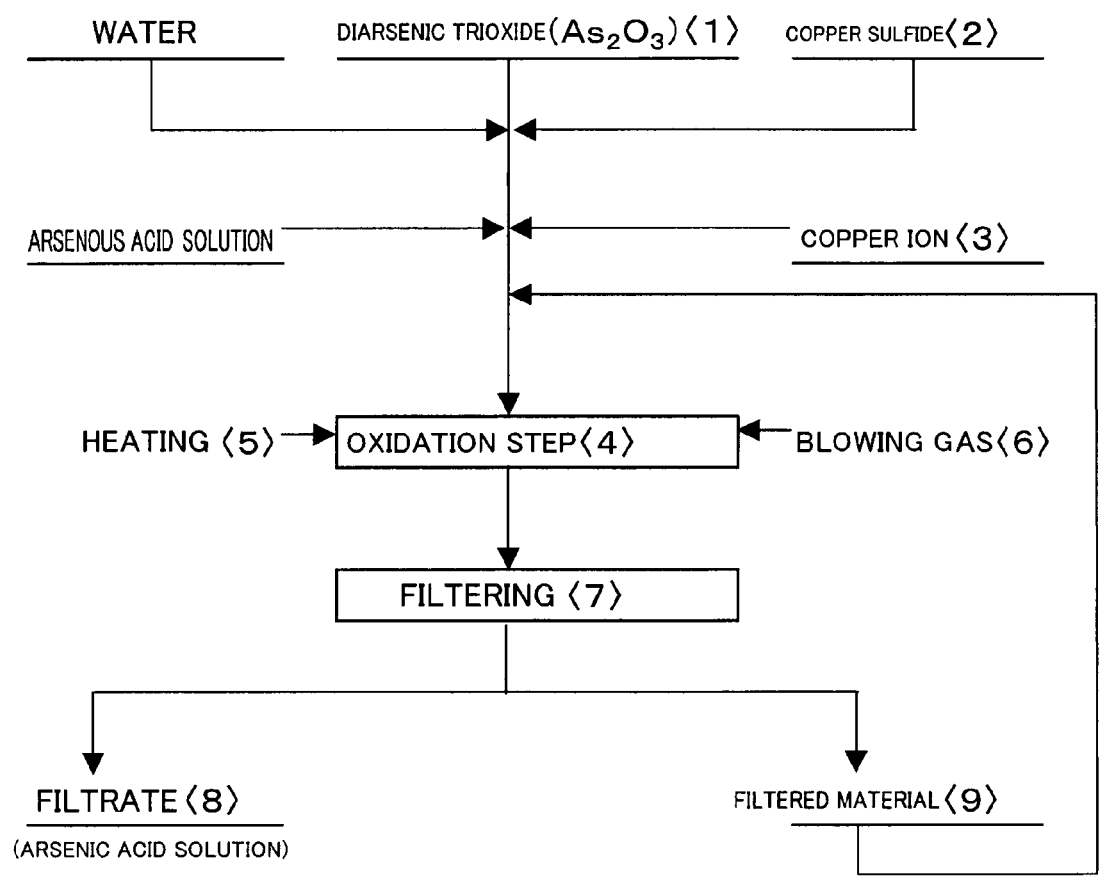
FIG. 3 is a flowchart according to an embodiment (second embodiment) of the present invention.
Figure 4:
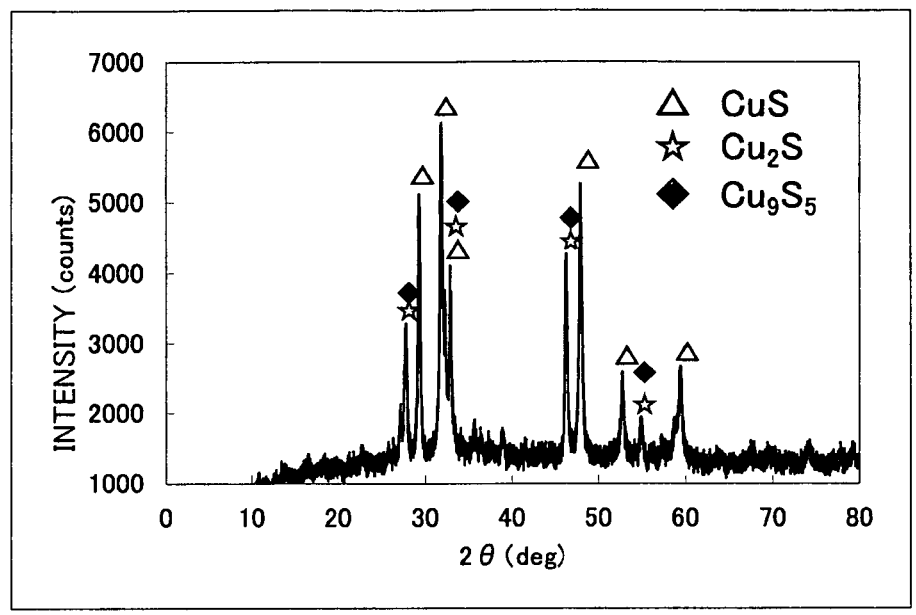
FIG. 4 shows the X-ray diffraction results of copper sulfide in Example 5.
Figure 5:
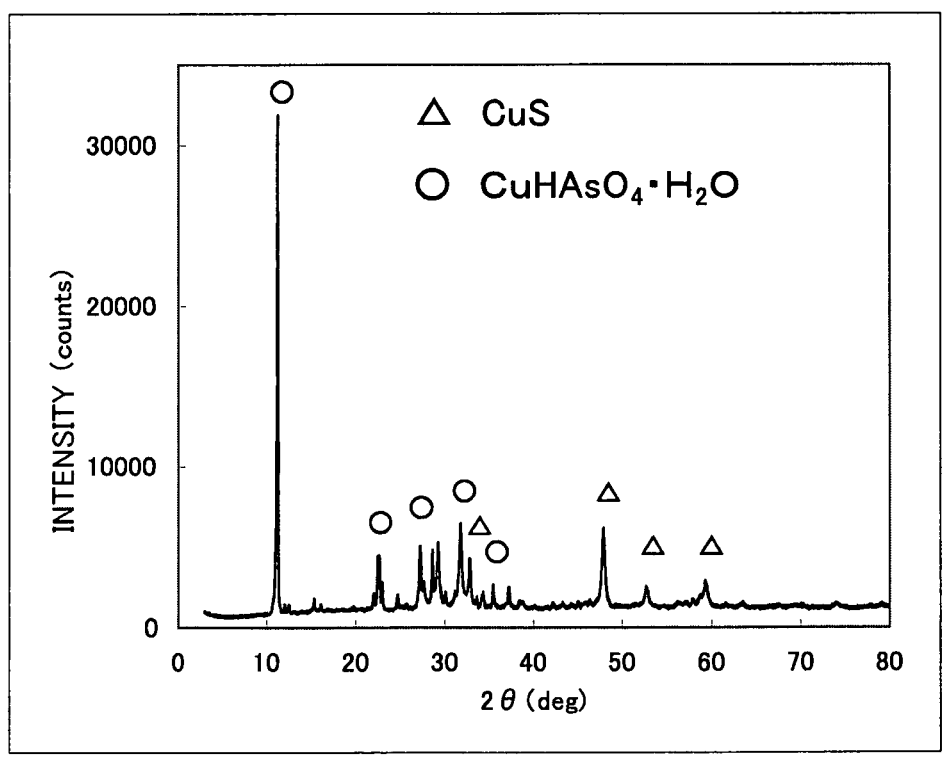
FIG. 5 shows the X-ray diffraction results of the residue in Example 5.
Figure 6:
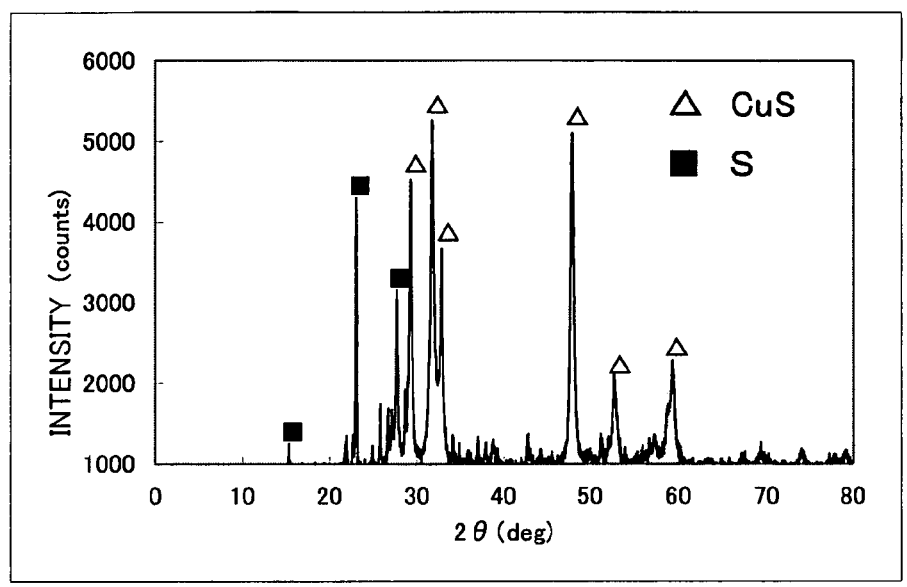
FIG. 6 shows the X-ray diffraction results of the residue in Comparative Example 7.
Figure 7:
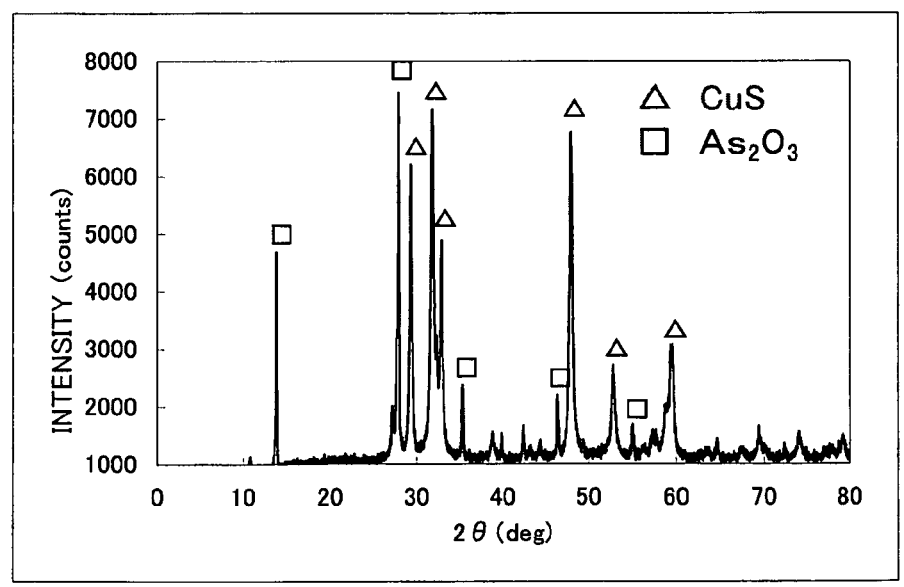
FIG. 7 shows the X-ray diffraction results of the residue in Comparative Example 8.

The invention claimed is:

1. An arsenic removal method, comprising:
a leaching step of leaching a non-ferrous smelting intermediate comprising a copper arsenic compound in the form of an intermetallic compound in the presence of monatomic sulfur, and obtaining a leaching solution comprising arsenic;
a solution adjusting step of oxidizing trivalent arsenic in the leaching solution to pentavalent arsenic, and obtaining an adjusted solution; and
a crystallizing step of converting the arsenic in the adjusted solution to scorodite,
wherein said leaching step comprises forming a slurry from a mixture of the non-ferrous smelting intermediate and monatomic sulfur, and performing to the slurry one or more actions selected from the group consisting of blowing in of air, blowing in of oxygen, blowing in of a gas mixture of oxygen and air, and addition of a sulfidizing agent, at a temperature of 50° C. or higher until the redox potential in the slurry is 250 mV or higher with Ag/AgCl reference electrode.

2. The arsenic removal method according to claim 1, wherein said copper arsenic compound comprises one or more materials selected from copper arsenide and decoppered electrolytic slime.

3. The arsenic removal method according to claim 1, wherein in said leaching step, the sulfidizing agent is added at the beginning of the step, and thereafter, one or more actions are performed selected from the group consisting of blowing in of air, blowing in of oxygen, and blowing in of a gas mixture of oxygen and air to the slurry.

4. The arsenic removal method according to claim 1, wherein in said leaching step, a portion of the sulfidizing agent is added at the beginning of the step, thereafter, one or more actions are performed selected from the group consisting of blowing in of air, blowing in of oxygen, and blowing in of a gas mixture of oxygen and air to the slurry, and then the remaining portion of the sulfidizing agent is added.

5. The arsenic removal method according to claim 1, wherein in said solution adjusting step, hydrogen peroxide is added to the leaching solution at a temperature of 40° C. or higher to oxidize the trivalent arsenic to pentavalent arsenic, and then the leaching solution is brought into contact with metallic copper to remove the residual hydrogen peroxide in the leaching solution.

6. The arsenic removal method according to claim 1, wherein said crystallizing step is performed in a pH range of 1.2 or lower.

7. The arsenic removal method according to claim 1, wherein said crystallizing step comprises adding and dissolving ferrous salt into said adjusted solution, and oxidizing the ferrous salt.

8. The arsenic removal method according to claim 1, wherein said crystallizing step is performed at a temperature of 50° C. or higher.

9. The arsenic removal method according to claim 1, wherein an oxidation reaction in the crystallizing step is performed by blowing in air, oxygen, or a gas mixture thereof in the adjusted solution.

* * * * *